United States Patent
Kim et al.

(10) Patent No.: US 7,847,901 B2
(45) Date of Patent: Dec. 7, 2010

(54) LIQUID CRYSTAL DISPLAY

(75) Inventors: Hyun-Wuk Kim, Yongin-si (KR);
Kyoung-Ju Shin, Yongin-si (KR);
Hak-Sun Chang, Yongin-si (KR);
Seung-Hoo Yoo, Seongnam-si (KR);
Hee-Wook Do, Suwon-si (KR);
Yoon-Sung Um, Yongin-si (KR);
Mee-Hye Jung, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/689,075

(22) Filed: Jan. 18, 2010

(65) Prior Publication Data

US 2010/0118247 A1 May 13, 2010

Related U.S. Application Data

(62) Division of application No. 11/477,644, filed on Jun. 29, 2006, now Pat. No. 7,656,487.

(30) Foreign Application Priority Data

Jul. 1, 2005 (KR) ............. 10-2005-0059157
Aug. 9, 2005 (KR) ............. 10-2005-0072794

(51) Int. Cl.
*G02F 1/1337* (2006.01)
(52) U.S. Cl. ............ 349/129; 349/39; 349/142
(58) Field of Classification Search ......... 349/96, 349/129, 139, 141–146
See application file for complete search history.

(56) References Cited

U.S. PATENT DOCUMENTS

2003/0231274 A1 12/2003 Wu
2004/0075798 A1 4/2004 Inoue et al.

(Continued)

FOREIGN PATENT DOCUMENTS

CN 1550862 12/2004

(Continued)

*Primary Examiner*—Ellen Kim
(74) *Attorney, Agent, or Firm*—F. Chau & Associates, LLC

(57) ABSTRACT

A liquid crystal display includes a substrate, a pixel electrode disposed on the substrate and including a first subpixel electrode and a second subpixel electrode, and a common electrode facing the pixel electrode. The first subpixel electrode comprises a first edge, a second edge disposed opposite the first edge, and two first oblique edges substantially parallel to each other, the first oblique edges making an oblique angle with the first edge and the second edge and meeting the first edge. The second subpixel electrode comprises a first edge, a second edge disposed opposite the first edge, and two first oblique edges substantially parallel to or substantially perpendicular to the first oblique edges of the first subpixel electrode, the first oblique edges of the second subpixel electrode meeting the first edge of the second subpixel electrode. The first edge of the first subpixel electrode is adjacent to the first edge of the second subpixel electrode, and a length of the first edge of the first subpixel electrode is different from a length of the first edge of the second subpixel electrode. The first oblique edges of the first subpixel electrode are offset from the first oblique edges of the second subpixel electrode.

4 Claims, 23 Drawing Sheets

U.S. PATENT DOCUMENTS

| | | | |
|---|---|---|---|
| 2004/0075799 A1 | 4/2004 | Lin | |
| 2005/0024567 A1 | 2/2005 | Sawasaki et al. | |
| 2005/0083469 A1 | 4/2005 | Chien et al. | |
| 2006/0290827 A1 | 12/2006 | Kihara et al. | |
| 2007/0002253 A1* | 1/2007 | Kim et al. | 349/144 |
| 2007/0146563 A1 | 6/2007 | Yun et al. | |
| 2007/0146600 A1 | 6/2007 | Song | |
| 2007/0258031 A1* | 11/2007 | Choi et al. | 349/129 |

FOREIGN PATENT DOCUMENTS

| | | |
|---|---|---|
| JP | 2003-043488 | 2/2003 |
| JP | 2004-046123 | 2/2004 |
| JP | 2004-139108 | 5/2004 |
| JP | 2004-318077 | 11/2004 |
| JP | 2005-049740 | 2/2005 |
| JP | 2005-055910 | 3/2005 |
| JP | 2005070151 | 3/2005 |
| KR | 1020050016833 | 2/2005 |
| KR | 1020050017033 | 2/2005 |
| KR | 1020050018100 | 2/2005 |
| KR | 10200050015520 | 2/2005 |
| KR | 1020050021294 | 3/2005 |
| KR | 1020050025780 | 3/2005 |
| KR | 1020050028703 | 3/2005 |

* cited by examiner

LIQUID CRYSTAL DISPLAY

CROSS-REFERENCE TO RELATED PATENT APPLICATIONS

This Application is a divisional of U.S. patent application Ser. No. 11/477,644 filed on Jun. 29, 2006 which claims priority to Korean patent application numbers 10-2005-0059157, filed on Jul. 1, 2005, and 10-2005-0072794, filed on Aug. 9, 2005, the contents of which are herein incorporated by reference in their entirety.

BACKGROUND OF THE INVENTION

1. Technical Field

The present disclosure relates to a liquid crystal display.

2. Discussion of Related Art

A liquid crystal display (LCD) is one of the most widely used flat panel displays. An LCD may include two panels provided with pixel electrodes and a common electrode (commonly referred to as "field generating electrodes") and having a liquid crystal (LC) layer interposed between the two panels. An LCD generates an electric field in the LC layer by applying voltages to the field generating electrodes. When an electric field is applied, the LC molecules in the LC layer are tilted with respect to an axis normal to the panels at angles dependent on the strength of the electric field. The LCD displays images by controlling the strength of the electric field, which determines orientations of LC molecules to adjust polarization of incident light.

An LCD further includes switching elements connected to the pixel electrodes and a plurality of signal lines such as gate lines and data lines for controlling the switching elements to apply voltages to the pixel electrodes.

A vertical alignment (VA) mode LCD, in which longitudinal axes of the LC molecules are aligned perpendicular to the two panels in the absence of an electric field, can produce a relatively high contrast ratio and wide reference viewing angle.

The wide viewing angle of the VA mode LCD can be realized by cutouts or protrusions on the field-generating electrodes. Since the tilt directions of the LC molecules are determined by the cutouts or the protrusions, the tilt directions can be distributed into several directions by appropriately arranging the cutouts and the protrusions such that the reference viewing angle is widened.

However, the protrusions and the cutouts may obstruct the passage of incident light, and the light transmittance may decrease as the number of protrusions or cutouts increases. In one method to increase the light transmittance, the area of the pixel electrodes is enlarged. However, in such a configuration, strong lateral electric fields are generated near the edges of the pixel electrodes. The lateral electric fields disorder the orientations of the LC molecules which generates texture and light leakage and lengthens the response time.

In addition, the VA mode LCD may have poor lateral visibility as compared with frontal visibility. For example, in a conventional LCD provided with cutouts in the field-generating electrodes, the luminance is enhanced toward the display's lateral sides, and, in a the worse case, the luminance difference between high grays vanishes such that the image cannot be perceived.

SUMMARY OF THE INVENTION

A liquid crystal display according to an exemplary embodiment of the present invention includes: a substrate; a pixel electrode disposed on the substrate and including a first subpixel electrode and a second subpixel electrode; and a common electrode facing the pixel electrode. The first subpixel electrode comprises a first edge, a second edge disposed opposite the first edge, and two first oblique edges substantially parallel to each other, the first oblique edges making an oblique angle with the first edge and the second edge and meeting the first edge. The second subpixel electrode comprises a first edge, a second edge disposed opposite the first edge, and two first oblique edges substantially parallel to or substantially perpendicular to the first oblique edges of the first subpixel electrode, the first oblique edges of the second subpixel electrode meeting the first edge of the second subpixel electrode. The first edge of the first subpixel electrode is adjacent to the first edge of the second subpixel electrode, and a length of the first edge of the first subpixel electrode is different from a length of the first edge of the second subpixel electrode. The first oblique edges of the first subpixel electrode are offset from the first oblique edges of the second subpixel electrode.

The liquid crystal display may further include a polarizer having a polarization axis making an angle of about 45 degrees with the first oblique edges of the first subpixel electrode and the first oblique edges of the second subpixel electrode.

A center of the first edge of the first subpixel electrode may be aligned with a center of the first edge of the second subpixel electrode. The first subpixel electrode may further comprise two second oblique edges meeting the first oblique edges of the first subpixel electrode with making about a right angle. The second subpixel electrode may further comprise two second oblique edges meeting the first oblique edges of the second subpixel electrode with making about a right angle. The first oblique edges of the first subpixel electrode may make about a right angle with the first oblique edges of the second subpixel electrode.

The second subpixel electrode may include a first electrode part and a second electrode part separated from each other by the first subpixel electrode. The first electrode part may comprise the first oblique edges of the second subpixel electrode, and the second electrode part may comprise two second oblique edges substantially perpendicular to the first oblique edges of the second subpixel electrode. The first oblique edges of the first subpixel electrode may be substantially parallel to the first oblique edges of the second subpixel electrode.

The height of the first subpixel electrode may be substantially equal to a height of the second subpixel electrode. The first edge of the second subpixel electrode has a length about 1.8 to about 2 times a length of the second edge of the first subpixel electrode.

A distance between the first subpixel electrode and the second subpixel electrode may be equal to about 5.5 microns to about 7.5 microns.

The liquid crystal display may further include a first tilt direction determining member disposed at the common electrode.

The first tilt direction determining member may include a first cutout, wherein the first cutout may pass through one of the first and the second subpixel electrodes and may include an oblique portion extending substantially parallel to the first oblique edges of the first and the second subpixel electrodes.

The width of the first cutout may be equal to about 9.5 microns to about 10.5 microns.

The first cutout may further include a terminal portion connected to the oblique portion of the first cutout, overlapping the first or the second edge of the first or the second subpixel electrode, and having an edge making an angle larger than about 135 degrees.

The liquid crystal display may further include a second tilt direction determining member disposed at the second subpixel electrode.

The second tilt direction determining member may include a second cutout having an oblique portion bisecting the second subpixel electrode and extending substantially parallel to the first oblique edges of the second subpixel electrode.

The width of the second cutout may be equal to about 8 microns to about 10 microns.

The liquid crystal display may further include a storage electrode disposed on the substrate. The storage electrode may be disposed near a boundary between the first subpixel electrode and the second subpixel electrode adjacent to the first subpixel electrode in a row direction. The terminal portion of the first cutout may overlap the storage electrode. A distance between an edge of the storage electrode and an edge of the terminal portion adjacent to the edge of the storage electrode may be equal to or larger than about one micron.

A distance between the oblique portion of the first cutout and one of the first oblique edges of the first or the second subpixel electrode and a distance between the oblique portion of the second cutout and the oblique portion of the first cutout may be equal to about 25 microns to about 40 microns.

A distance between the first cutout and the second cutout may be shorter than a distance between the first cutout and one of the first oblique edges of the first or the second subpixel electrode.

The distance between the oblique portion of the second cutout and the oblique portion of the first cutout may be equal to about 20 microns to about 30 microns, and the distance between one of the first oblique edges of the second subpixel electrode and the oblique portion of the first cutout may be equal to about 20 microns to about 30 microns.

The oblique portion of the second cutout may meet the oblique portion of the first cutout passing through the first subpixel electrode.

The first subpixel electrode and the second subpixel electrode may have different voltages.

An area of the first subpixel electrode may be smaller than an area of the second subpixel electrode, and the voltage of the first subpixel electrode may be higher than the voltage of the second subpixel electrode.

The area of the second subpixel electrode may be about 1.8 to about 2 times the area of the first subpixel electrode.

The first subpixel electrode and the second subpixel electrode may be supplied with different data voltages obtained from a single image information.

The liquid crystal display may further include: a first thin film transistor coupled to the first subpixel electrode; a second thin film transistor coupled to the second subpixel electrode; a first signal line coupled to the first thin film transistor; a second signal line coupled to the second thin film transistor; and a third signal line coupled to the first and the second thin film transistors and intersecting the first and the second signal lines.

The first thin film transistor may turn on to transmit a signal from the third signal line in response to a signal from the first signal line, while the second thin film transistor may turn on to transmit a signal from the third signal line in response to a signal from the second signal line.

The first and the second thin film transistors may turn on to transmit a signal from the first signal line in response to a signal from the third signal line, while the second thin film transistor may turn on to transmit a signal from the second signal line in response to a signal from the third signal line.

The first subpixel electrode and the second subpixel electrode may be capacitively coupled to each other.

The liquid crystal display may further include: a thin film transistor coupled to the first subpixel electrode; a first signal line coupled to the thin film transistor; and a second signal line coupled to the thin film transistor and intersecting the first signal line.

The first and the second subpixel electrodes may be connected to each other.

A liquid crystal display according to an exemplary embodiment of the present invention includes: a pixel electrode including a first subpixel electrode and a second subpixel electrode, each of the first and the second subpixel electrodes including two oblique edges disposed opposite each other and substantially parallel to each other, the first and the second subpixel electrodes arranged in a direction oblique to the oblique edges; a common electrode disposed opposite the pixel electrode; a liquid crystal layer disposed between the pixel electrode and the common electrode; a first tilt direction determining member provided at the second subpixel electrode, extending substantially parallel to the oblique edges, and determining a tilt direction of liquid crystal molecules in the liquid crystal layer; and a plurality of second tilt direction determining members provided at the common electrode and determining tilt directions of the liquid crystal molecules, each of the second tilt direction determining members including a first portion substantially parallel to the oblique edges and either disposed between the oblique edges or between one of the oblique edge and the first tilt direction determining member. Each of the first and the second subpixel electrodes is divided into a plurality of sub-areas by the first or the second tilt direction determining members and the oblique edges. The number of the sub-areas in the first subpixel electrode is different from the number of the sub-areas in the second subpixel electrode. The oblique edges of the first subpixel electrode are offset from the oblique edges of the second subpixel electrode.

The liquid crystal display may further include a polarizer having a polarization axis making an angle of about 45 degrees with the oblique edges of the first subpixel electrode and the oblique edges of the second subpixel electrode.

The sub-areas may have substantially equal area.

An area of each of the sub-areas may be a relatively smaller area in relation to a distance of the sub-area from the oblique edges.

A liquid crystal display according to an exemplary embodiment of the present invention includes: a substrate; a first pixel electrode disposed on the substrate and including a first subpixel electrode and a second subpixel electrode; a second pixel electrode disposed on the substrate and including a third subpixel electrode and a fourth subpixel electrode; and a common electrode disposed opposite the first and the second pixel electrodes. Each of the first and the third subpixel electrodes comprises a first edge, a second edge disposed opposite the first edge, and two first oblique edges substantially parallel to each other, and the first oblique edges make an oblique angle with the first edge and the second edge and meet the first edge. Each of the second and the fourth subpixel electrodes comprises a first edge, a second edge disposed opposite the first edge, and two first oblique edges substantially parallel to or perpendicular to the first oblique edges of the first and the third subpixel electrodes, and the first oblique edges of the second and the fourth subpixel electrode meet the first edge of the second and the fourth subpixel electrode, respectively. The first edge of the first subpixel electrode is adjacent to the first edge of the second subpixel electrode, and the first edge of the third subpixel electrode is adjacent to the first edge of the fourth subpixel electrode. The first edge of the first subpixel electrode has a length different from a length of the first edge of the second subpixel electrode, and a length of the first edge of the third subpixel electrode may be different from a length of the first edge of the fourth subpixel electrode. The first oblique edges of the first subpixel electrode are offset from the first oblique edges of the second subpixel electrode, and the first oblique edges of the third subpixel electrode are offset from the first oblique edges of the fourth subpixel electrode.

Each of the first to the fourth subpixel electrodes may further comprise two second oblique edges meeting the first oblique edges thereof with making about a right angle. The first oblique edges of the first and the third subpixel electrodes may make an angle of about 90 degrees with the first oblique edges of the second and the fourth subpixel electrodes, respectively. The first and the second oblique edges of the first subpixel electrode may be adjacent to the first and the second oblique edges of the third subpixel electrode, respectively, and the first and the second oblique edges of the fourth subpixel electrode may be adjacent to the first and the second oblique edges of the second subpixel electrode, respectively. A center of the first edge of the first subpixel electrode may be aligned with a center of the first edge of the second subpixel electrode, and a center of the first edge of the third subpixel electrode may be aligned with a center of the first edge of the fourth subpixel electrode.

The second subpixel electrode may include a first electrode part and a second electrode part separated from each other by the first subpixel electrode, and the fourth subpixel electrode may include a first electrode part and a second electrode part separated from each other by the third subpixel electrode. Each of the first and the third subpixel electrodes may further comprise two second oblique edges making about a right angle with the first oblique edges thereof, respectively. The first electrode part of the second or the fourth subpixel electrode may include the first oblique edges of the second or the fourth subpixel electrode, and the second electrode part of the second or the fourth subpixel electrode may include two second oblique edges making about a right angle with the first oblique edges of the second or the fourth subpixel electrode. The first oblique edges of the first and the third subpixel electrodes may be substantially parallel to the first oblique edges of the second and the fourth subpixel electrodes. The first oblique edges of the first electrode part of the second subpixel electrode may be adjacent to the first oblique edges of the first electrode part of the fourth subpixel electrode, and the first and the second oblique edges of the first subpixel electrode may be adjacent to the first and the second oblique edges of the third subpixel electrode, respectively.

The first or the second edges of the first to the fourth subpixel electrodes may make an angle of about 45 degrees or about 135 degrees with the first or the second oblique edges thereof.

The first to the fourth subpixel electrodes may have substantially the same height.

A length of the first edges of the second and the third subpixel electrodes may be about 1.8 to about 2 times a length of the second edges of the first and the fourth subpixel electrodes.

A liquid crystal display according to an exemplary embodiment of the present invention includes: a substrate; a pixel electrode disposed on the substrate and including a first subpixel electrode and a second subpixel electrode; and a common electrode facing the pixel electrode. Each of the first and the second subpixel electrodes comprises two curved edges substantially parallel to each other. The common electrode includes a first cutout, and the first and the second subpixel electrodes have a second cutout. A width of the second cutout is greater than a width of the first cutout.

The width of the second cutout may be greater than the width of the first cutout by about 1-2 microns. The width of the first cutout may be equal to about 9.5 microns to about 10.5 microns, and the width of the second cutout may be equal to about 8 microns to about 10 microns.

A distance between the first subpixel electrode and the second subpixel electrode may be equal to about 5.5 microns to about 7.5 microns.

The liquid crystal display may further include a storage electrode formed on the substrate and disposed near a boundary between the first subpixel electrode and the second subpixel electrode, wherein the first cutout or the second cutout including a portion overlapping the storage electrode, and a distance between an edge of the storage electrode and an edge of the overlapping portion of the first cutout or the second cutout is greater than about one micron. The overlapping portion of the first cutout or the second cutout has a width that becomes narrow as goes to an end thereof.

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
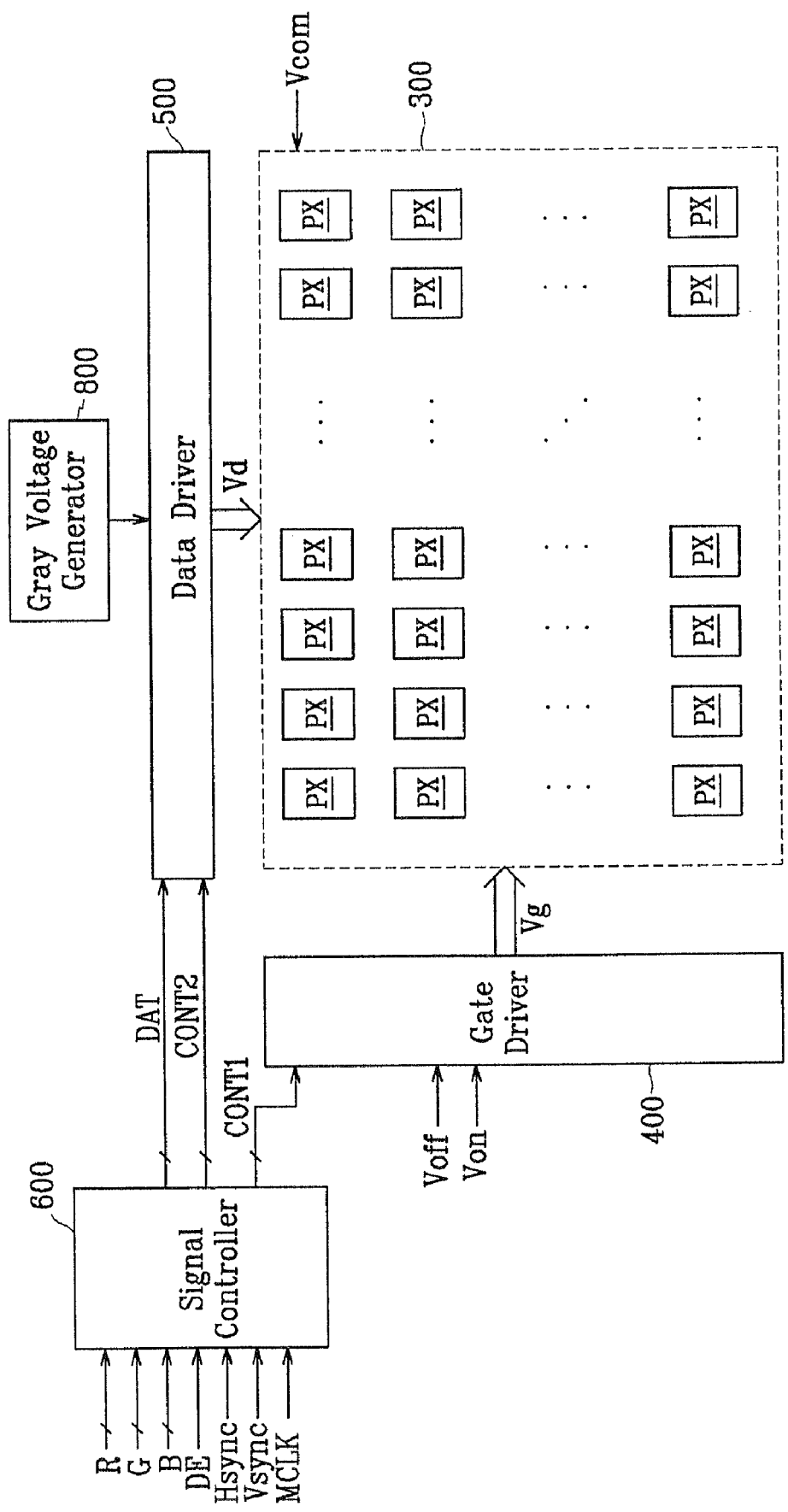
FIG. 1 is a block diagram of an LCD according to an exemplary embodiment of the present invention.

Hereinafter, exemplary embodiments of present invention will be described in detail with reference to the accompanying drawings In the drawings, the thickness of layers, films and regions may be exaggerated for clarity. Like numerals refer to similar or identical elements throughout the description of the figures. It will be understood that when an element such as a layer, film, region or substrate is referred to as being "on" another element, it can be directly on the other element or intervening elements may also be present.

Hereinafter, an LCD according to an exemplary embodiment of the present invention will be described in detail with reference to FIGS. 1 and 2.

FIG. 1 is a block diagram of an LCD according to an exemplary embodiment of the present invention. FIG. 2 is an equivalent circuit diagram of a pixel of an LCD according to an exemplary embodiment of the present invention.

Referring to FIG. 1, an LCD includes a LC panel assembly 300, a gate driver 400 and a data driver 500 that are connected to the panel assembly 300, a gray voltage generator 800 connected to the data driver 500, and a signal controller 600.

The panel assembly 300 includes a plurality of signal lines (not shown) and a plurality of pixels PX connected thereto and arranged substantially in a matrix. As shown in FIG. 2, the panel assembly 300 includes a lower panel 100, an upper panel 200, and a LC layer 3 interposed therebetween.

The signal lines, which are provided on the lower panel 100, include a plurality of gate lines (not shown) transmitting gate signals (also referred to as "scanning signals") and a plurality of data lines (not shown) transmitting data signals. The gate lines extend substantially in a row direction and substantially parallel to each other, while the data lines extend substantially in a column direction and substantially parallel to each other.

Figure 2:
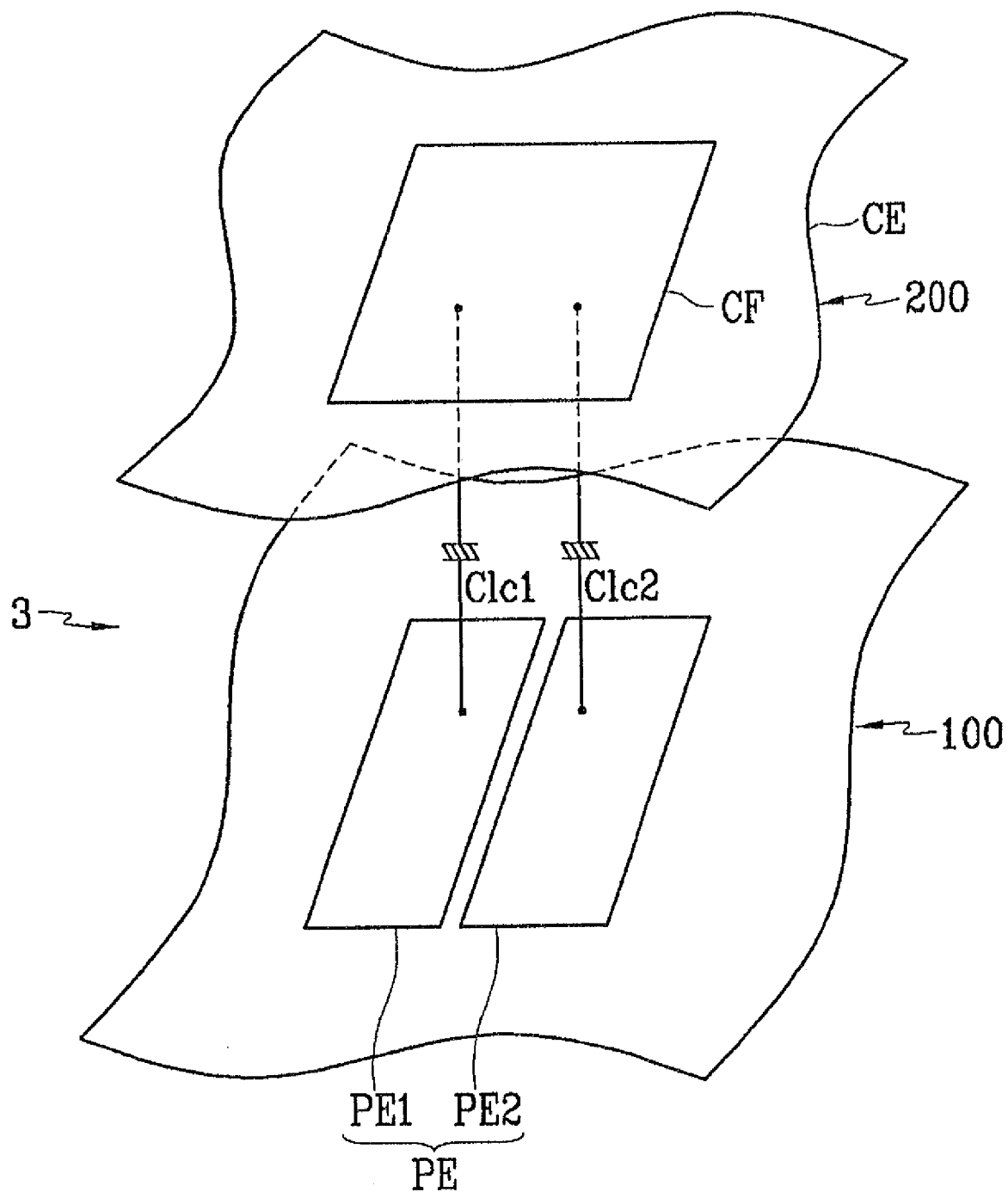
FIG. 2 is an equivalent circuit diagram of a pixel of an LCD according to an exemplary embodiment of the present invention.

Referring to FIG. 2, each pixel PX includes a pair of subpixels and each subpixel includes a liquid crystal (LC) capacitor Clc1/Clc2. At least one of the two subpixels further includes a switching element (not shown) connected to a gate line, a data line, and a LC capacitor Clc1/Clc2.

The LC capacitor Clc1/Clc2 includes a subpixel electrode PE1/PE2 and a common electrode CE provided on an upper panel 200 as two terminals. The LC layer 3 disposed between the electrodes PE1/PE2 and CE functions as a dielectric of the LC capacitor Clc1/Clc2. A pair of subpixel electrodes PE1 and PE2 are separated from each other and form a pixel electrode PE. The common electrode CE is supplied with a common voltage Vcom and covers an entire surface of the upper panel 200. The LC layer 3 has negative dielectric anisotropy. LC molecules in the LC layer 3 may be oriented so that longitudinal axes of the LC molecules are perpendicular to the surfaces of the panels 100 and 200 in absence of an electric field.

For a color display, each pixel PX uniquely represents one primary color (i.e., spatial division) or each pixel PX sequentially represents each primary color in turn (i.e., temporal division) such that a spatial or a temporal sum of the primary colors can be recognized as a desired color. For example the primary colors include red, green, and blue. FIG. 2 shows an example of spatial division in that each pixel PX includes a color filter CF representing one of the primary colors disposed in an area of the upper panel 200 facing the pixel electrode PE. Alternatively, the color filter CF is provided on or under the subpixel electrode PE1 or PE2 on the lower panel 100.

A pair of polarizers (not shown) are attached to outer surfaces of the panels 100 and 200. The polarization axes of the two polarizers may be crossed such that the crossed polarizers block the light incident onto the LC layer 3. One of the polarizers may be omitted.

Referring again to FIG. 1, the gray voltage generator 800 generates a plurality of gray voltages related to the transmittance of the pixels PX. However, the gray voltage generator 800 may generate only a given number of gray voltages (herein referred to as "reference gray voltages") instead of generating all of the gray voltages.

The gate driver 400 is connected to the gate lines of the panel assembly 300 and synthesizes the gate-on voltage Von and the gate-off voltage Voff from an external device to generate gate signals Vg to be applied to the gate lines.

The data driver 500 is connected to the data lines of the panel assembly 300 and applies data voltages Vd, which are selected from the gray voltages supplied from the gray voltage generator 800, to the data lines. However, the data driver 500 may generate gray voltages for all the grays by dividing the reference gray voltages when the gray voltage generator 800 generates reference gray voltages and then the data driver 500 selects the data voltages Vd from the generated gray voltages.

The signal controller controls the gate driver 400 and the data driver, etc.

Each of the processing units 400, 500, 600 and 800 may include at least one integrated circuit (IC) chip mounted on the LC panel assembly 300 or on a flexible printed circuit (FPC) film in a tape carrier package (TCP) type, which are attached to the panel assembly 300. Alternately, at least one of the processing units 400, 500, 600 and 800 may be integrated into the panel assembly 300 along with the signal lines and the switching elements. Alternatively, all of the processing units 400, 500, 600 and 800 may be integrated into a single IC chip. Alternatively, one or more of the processing units 400, 500, 600 and 800, or at least one circuit element of the processing units 400, 500, 600 and/or 800, may be external components.

The pixel electrodes, a common electrode, color filters, and data lines in LC panel assemblies according to exemplary embodiments of the present invention will be described in detail with reference to FIGS. 3, 4, 5, 6, 7A and 7B.

Figure 3:
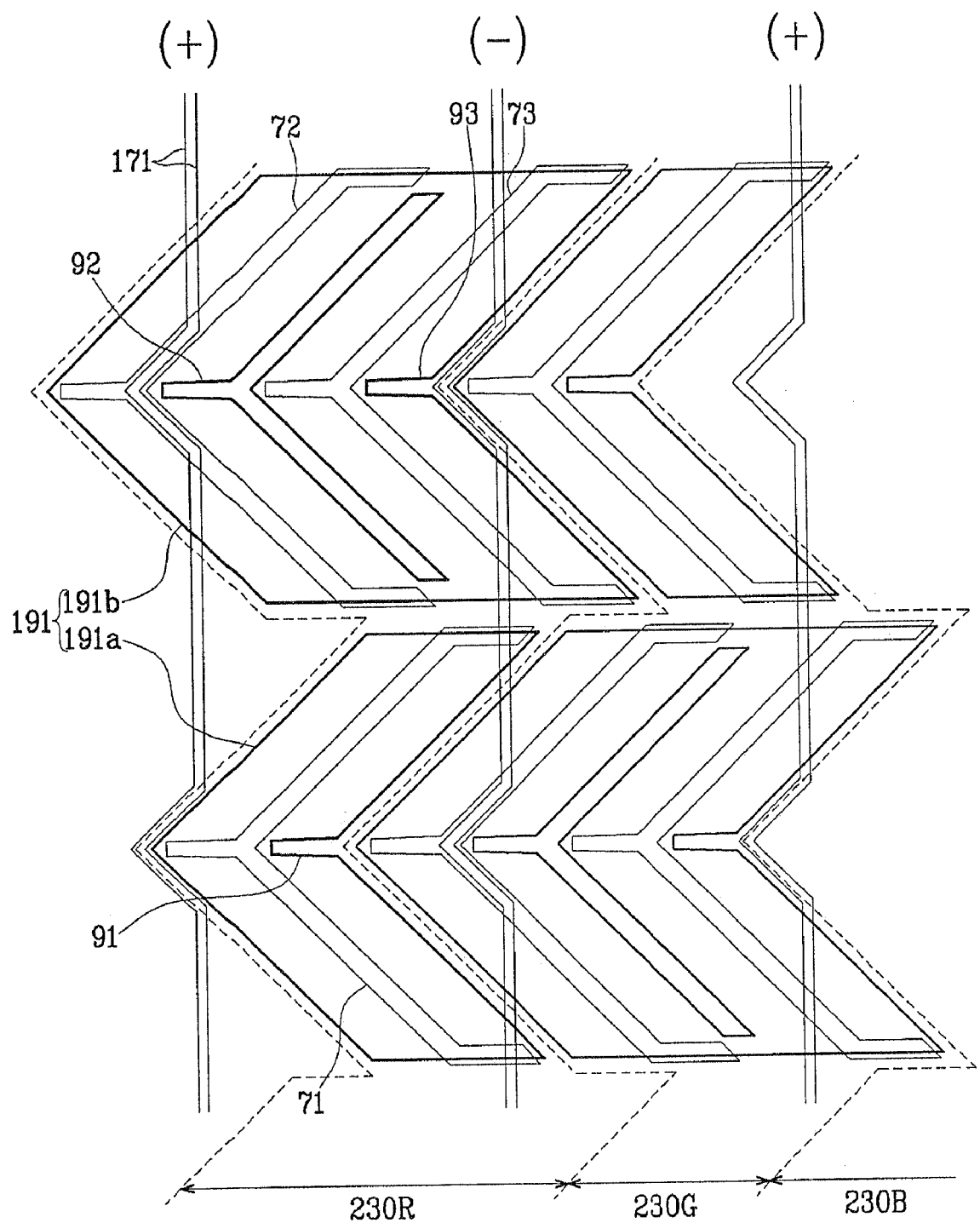
FIGS. 3-5 are layout diagrams of pixel electrodes, common electrodes, color filters, and data lines in LC panel assemblies according to exemplary embodiments of the present invention.
Figure 4:
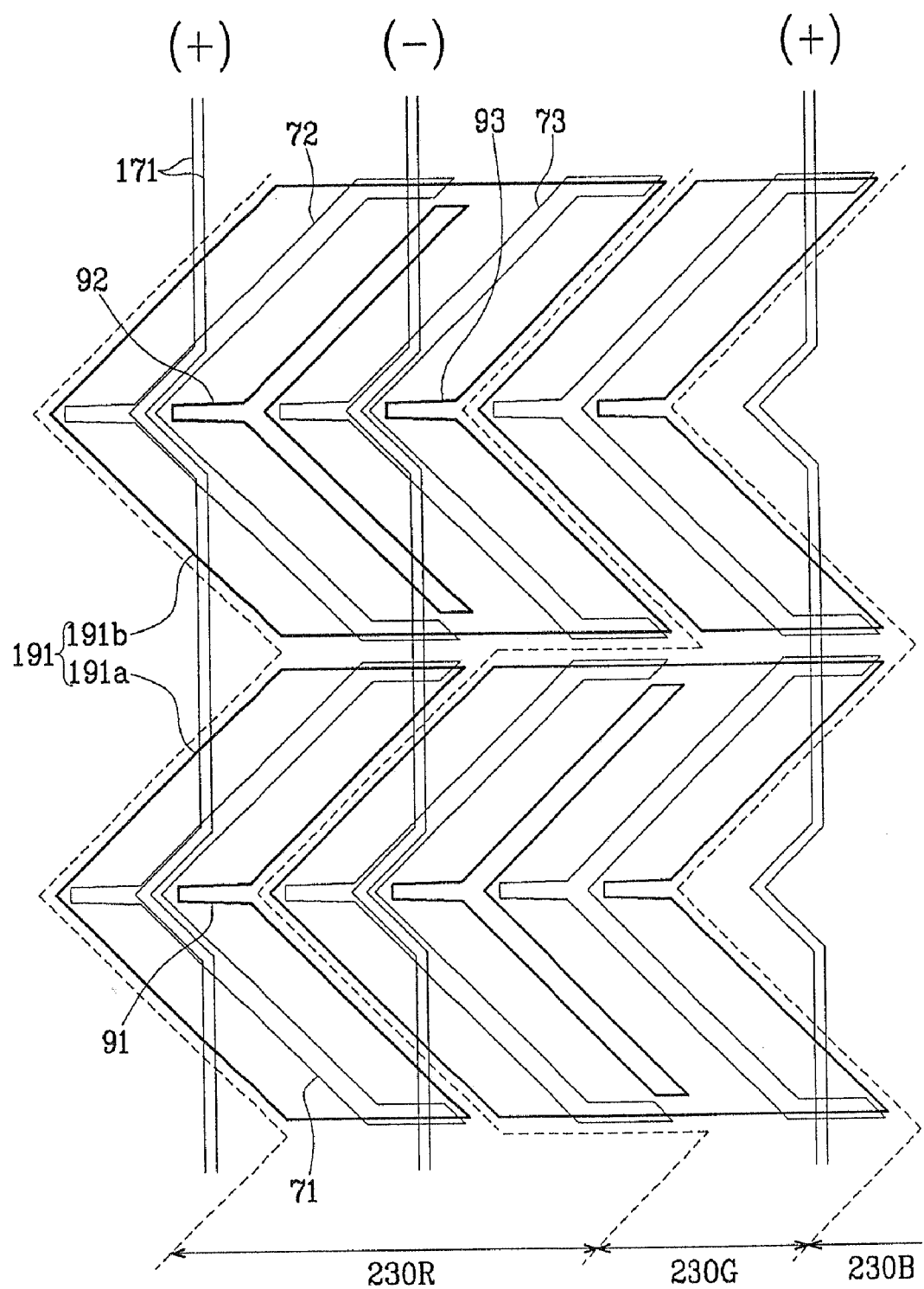
Figure 5:
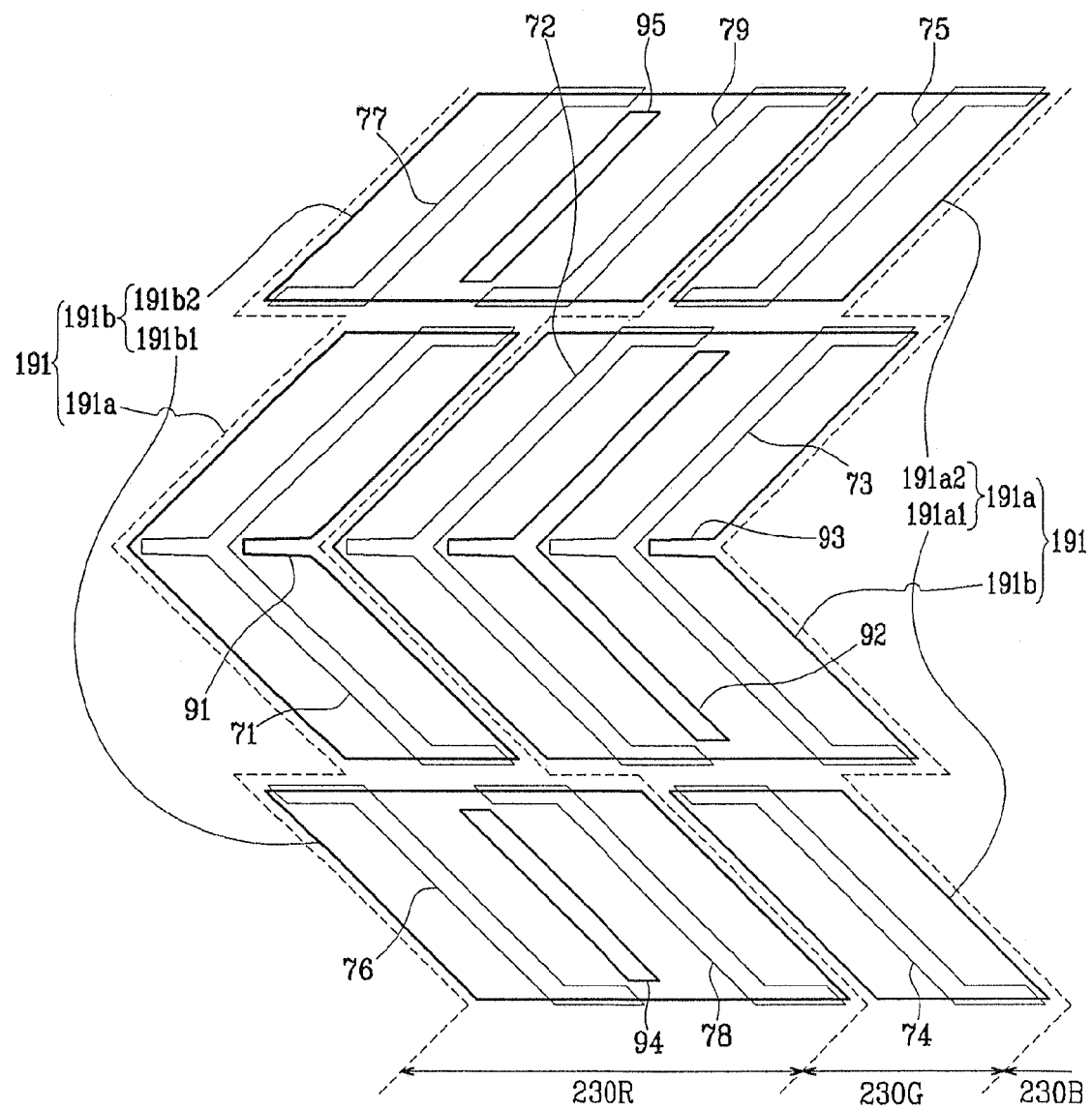
Figure 6:
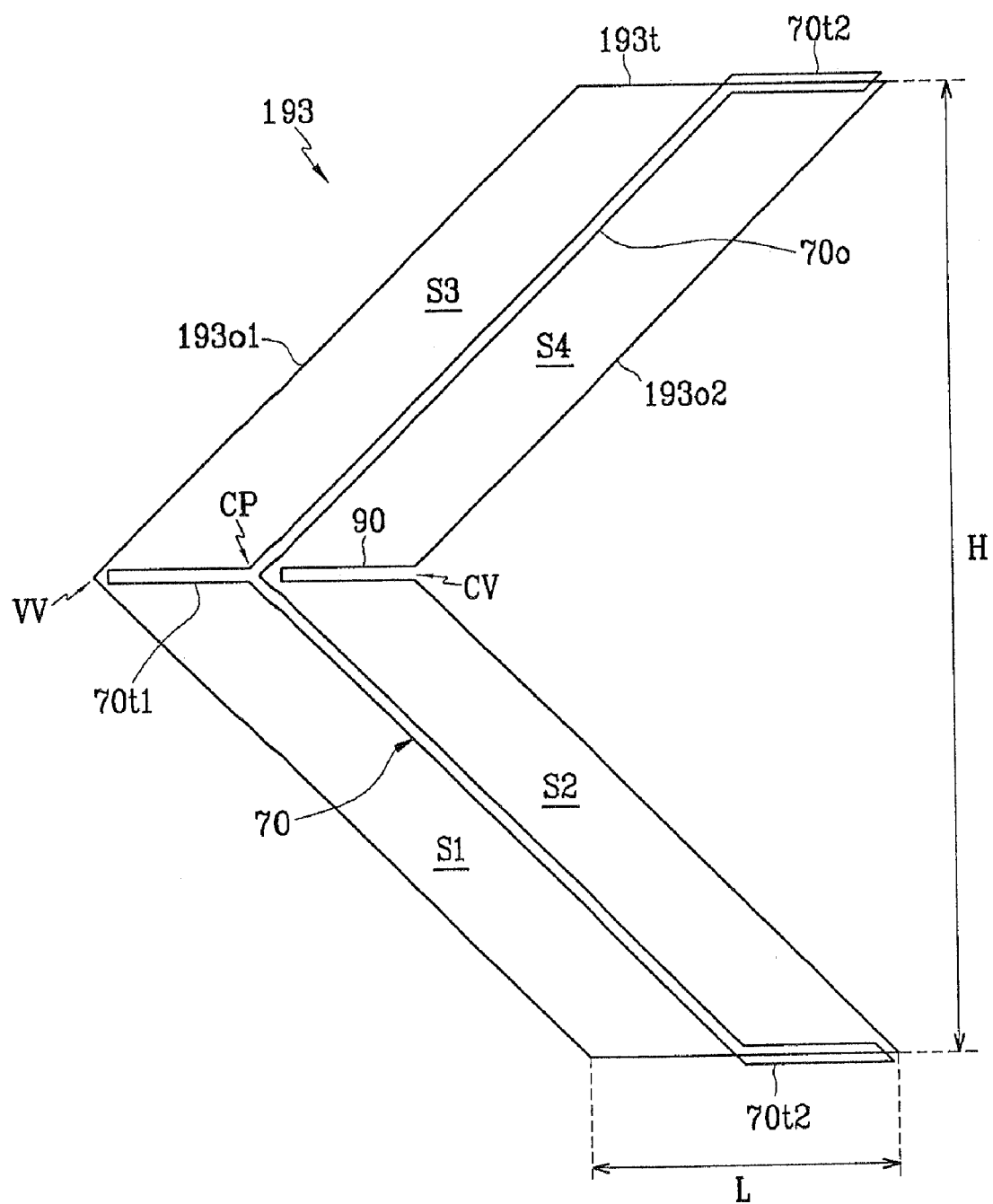
FIG. 6 is a planar view of a base electrode forming a subpixel electrode shown in FIGS. 3-5.
Figure 7A:
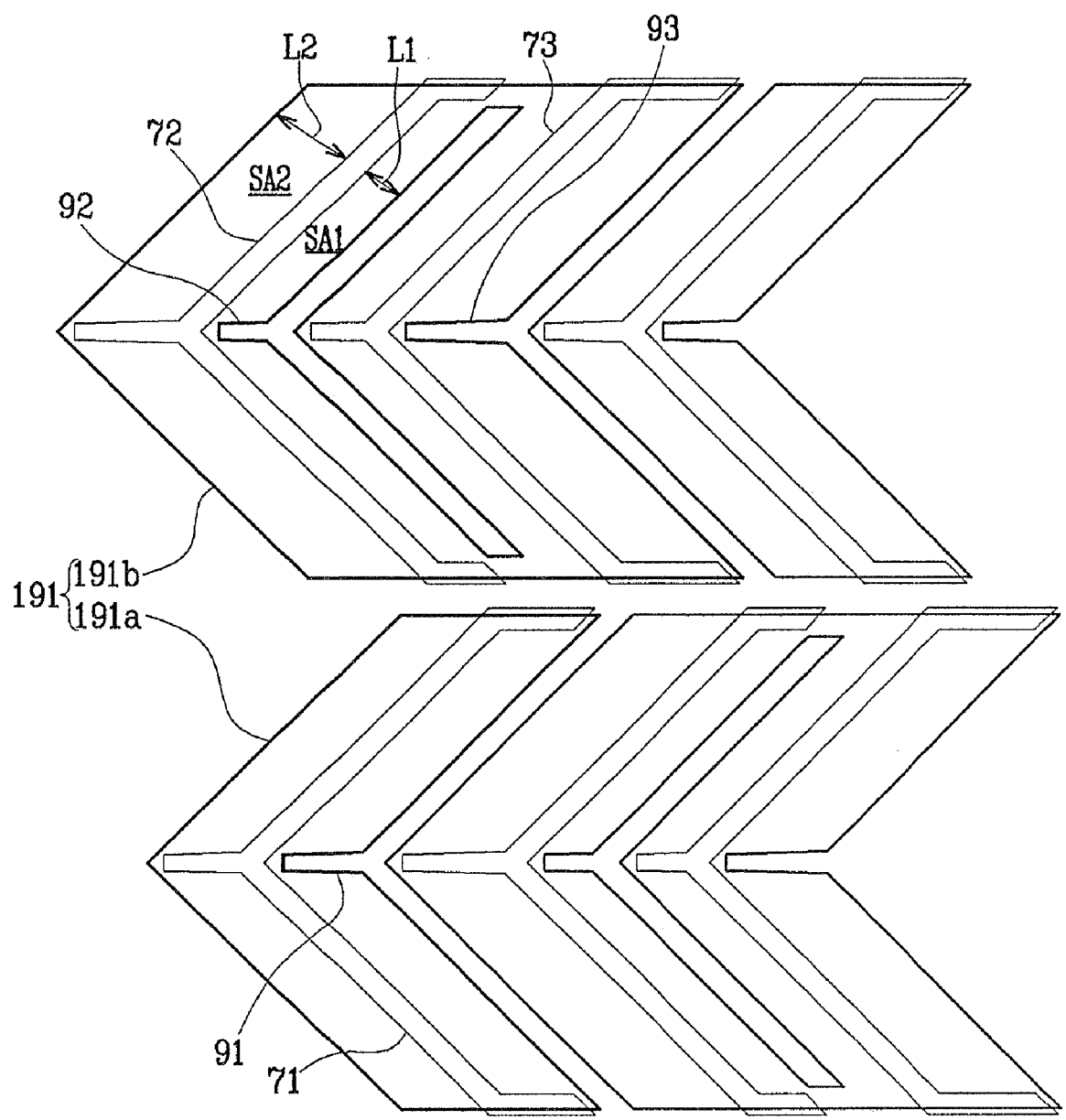
FIGS. 7A and 7B are layout diagrams of pixel electrodes and common electrodes in LC panel assemblies according to exemplary embodiments of the present invention.
Figure 7B:
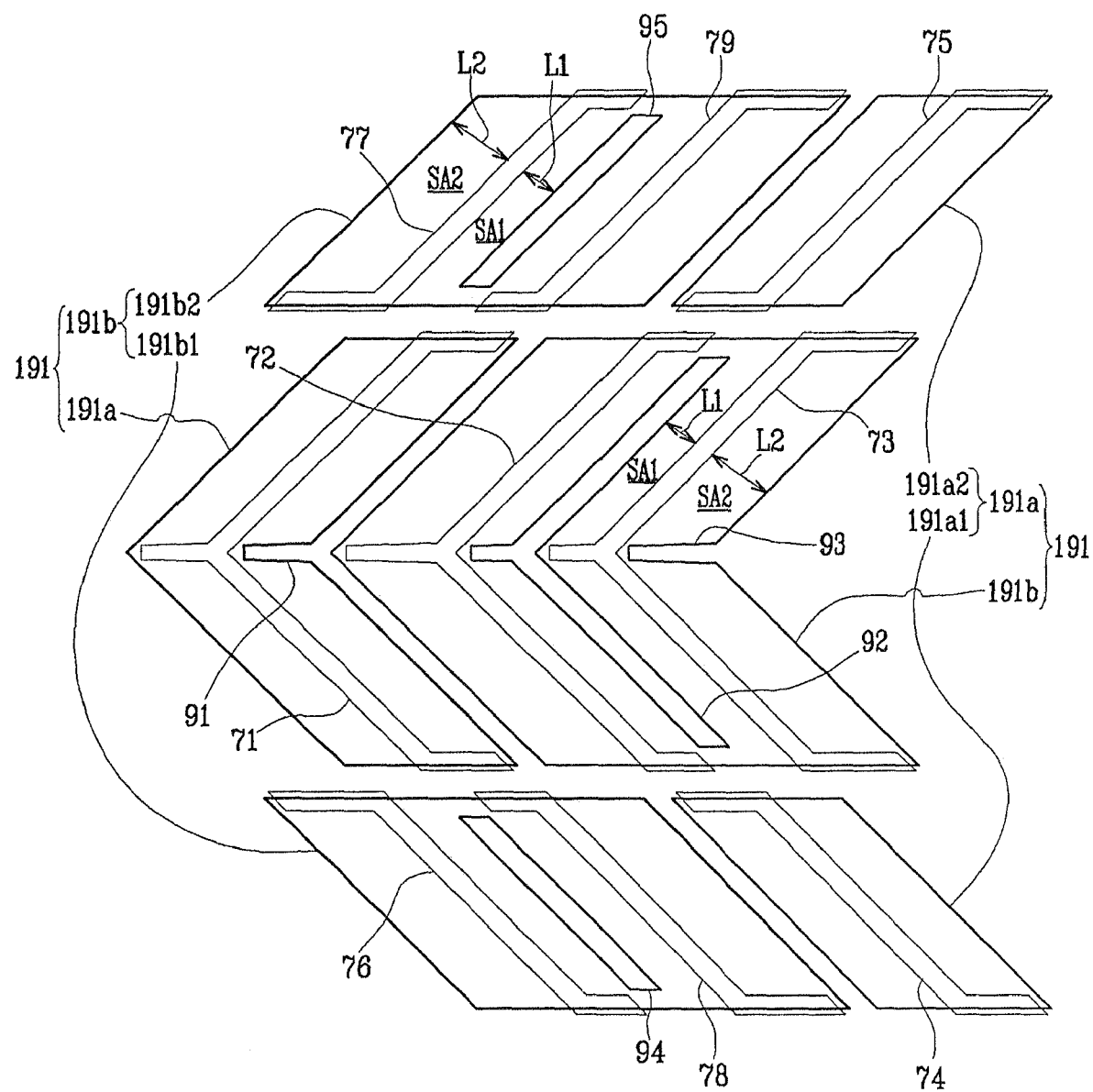

FIGS. 3-5 are layout diagrams of pixel electrodes, common electrodes, color filters, and data lines in LC panel assemblies according to exemplary embodiments of the present invention. FIG. 6 is a planar view of a base electrode forming a subpixel electrode shown in FIGS. 3-5. FIGS. 7A and 7B are layout diagrams of pixel electrodes and common electrodes in LC panel assemblies according to exemplary embodiments of the present invention.

Referring to FIGS. 3-5, each pixel electrode 191 of LC panel assemblies includes a first subpixel electrode 191a and a second subpixel electrode 191b that are separated from each other and adjacent to each other in a column direction. The subpixel electrodes 191a and 191b have cutouts 91, 92, 93, 94 and 95, and a common electrode CE (shown in FIG. 2) has a plurality of cutouts 71, 72, 73, 74, 75, 76, 77, 78 and 79 facing the subpixel electrodes 191a and 191b. Red color filters 230R, green color filters 230G, and blue color filters 230B extend along the pixel electrodes 191 adjacent in the column direction.

Both of the first and the second subpixel electrodes 191a and 191b forming a pixel electrode 191 may be coupled to respective switching elements (not shown). On the other hand, the first subpixel electrode 191a may be coupled to a switching element (not shown), while the second subpixel electrode 191b may be capacitively coupled to the first subpixel electrode 191a. Each of the switching elements is connected to a gate line and a data line. Reference numeral 171 shown in FIGS. 3-4 denotes a data line when both of the first and the second subpixel electrodes 191a and 191b are coupled to respective switching elements.

Referring to FIGS. 3 and 4, each of the subpixel electrodes 191a and 191b has a shape that is substantially the same as a base electrode 193 shown in FIG. 6, or a shape defined by a pair of a base electrodes 193 adjacent in a row direction that are connected to each other at upper and lower ends. Each of the cutouts 71-73 in the common electrode CE has substantially the same shape as a cutout 70 shown in FIG. 6. The arrangements of the subpixel electrodes 191a and 191b and the cutouts 71-73 and 91-93 shown in FIGS. 3 and 4 are obtained by repeating the arrangement of the base electrode 193 and the cutout 70 in the row and column directions.

As shown in FIG. 6, the base electrode 193 has a pair of curved edges 193o1 and 193o2 and a pair of transverse edges 193t and has a shape of a chevron. Each of the curved edges 193o1 and 193o2 includes a convex edge 193o1 meeting the transverse edges 193t at an obtuse angle, for example, about 135 degrees, and a concave edge 193o2 meeting the transverse edges 193t at an acute angle, for example, about 45 degrees. The curved edges 193o1 and 193o2, which are formed by the 90-degree meeting of a pair of oblique edges, have a curved angle of about a right angle. Each base electrode 193 has a cutout 90 that extends from a concave vertex CV on the concave edge 193o2 toward a convex vertex VV on the convex edge 193o1 and reaches near a center of the base electrode 193

The cutout 70 in the common electrode CE includes a curved portion 70o having a curved point CP, a center transverse portion 70t1 connected to the curved point CP of the curved portion 70o, and a pair of terminal transverse portions 70t2 connected to ends of the curved portion 70o. The curved portion 70o of the cutout 70 includes a pair of oblique portions meeting at about a right angle, extends substantially parallel to the curved edges 193o1 and 193o2 of the base electrode 193, and bisects the base electrode 193 into left and right halves. The center transverse portion 70t1 of the cutout 70 makes an obtuse angle, for example, about 135 degrees, with the curved portion 70o, and extends toward the convex vertex VV of the base electrode 193. The terminal transverse portions 70t2 are aligned with the transverse edges 193t of the base electrode 193 and make an obtuse angle, for example, about 135 degrees, with the curved portion 70o.

The base electrode 193 is divided into four sub-areas S1, S2, S3 and S4 by the cutouts 70 and 90. Each of the sub-areas S1-S4 has two primary edges defined by a curved portion 70o of the cutout 70 and by a curved edge 193o of the base electrode 193. The distance between the primary edges, i.e., the width of the sub-area S1-S4, may be equal to about 25 microns to about 40 microns.

The base electrode 193 and the cutout 70 has an inversion symmetry with respect to an imaginary straight line (herein referred to as a "center transverse line") connecting the convex vertex VV and the concave vertex CV of the base electrode 193.

As shown in FIGS. 3 and 4, the second subpixel electrode 191b has a shape defined by two base electrodes 193 that are connected at upper and lower ends thereof so that the concave edge of one of the two base electrodes 193 may neighbor the convex edge of the other of the two base electrodes 193. A gap between the two base electrodes 193 and a cutout 90 meeting the gap form a new cutout 92. The cutout 92 includes a curved portion bisecting the second subpixel electrode 191b into left and right halves and a transverse portion meeting the curved portion.

Referring to FIG. 6, the length L of a transverse edge 193t of the base electrode 193 is defined as the length of the base electrode 193, and the distance H between the two transverse edges 193t of the base electrode 193 is defined as the height of the base electrode 193. For example, the length and the height of a subpixel electrode including a base electrode 193 are defined in the above-described manner.

In FIGS. 3 and 4, the height of the first subpixel electrode 191b is substantially equal to the height of the second subpixel electrode 191b, and the length of the second subpixel electrode 191b is about 1.8 to about 2 times the length of the first subpixel electrode 191b. Accordingly, the area of the second subpixel electrode 191b is about 1.8 to about 2 times the area of the first subpixel electrode 191b.

As shown in FIGS. 3 and 4, the first subpixel electrode 191b and the second subpixel electrode 191b are alternately arranged in the row and column directions. Regarding the arrangement of the subpixel electrodes 191a and 191b in the row direction, the center transverse line of the first subpixel electrode 191b coincides with the first subpixel electrode 191b of the second subpixel electrode 191b. The convex edge of the first subpixel electrode 191b neighbors the concave edge of the second subpixel electrode 191b, and the concave edge of the first subpixel electrode 191b neighbors the convex edge of the second subpixel electrode 191b.

Regarding the arrangement in the column direction, since the lengths of the first and the second subpixel electrodes 191a and 191b are different, various arrangements are possible. One exemplary arrangement is to deviate the curved edges of one of the two subpixel electrodes 191a and 191b from the curved edges of the other of the two subpixel electrodes 191a and 191b. In an exemplary embodiment of the present invention shown in FIG. 3, the first subpixel electrode 191b is aligned with a center of the second subpixel electrode 191b. Alternatively, a curved edge of one of the subpixel electrodes 191a and 191b may meet a curved edge of the other of the subpixel electrodes 191a and 191b. In an exemplary embodiment of the present invention shown in FIG. 4, the convex edges (left edges) and the concave edges (right edges) of the first subpixel electrode 191b and the second subpixel electrode 191b are alternately aligned.

As shown in FIG. 3, the curved portion of the cutout 71 bisecting the first subpixel electrode 191b is connected to the curved portion of the cutout 92 bisecting the second subpixel electrode 191b. The convex edge and the concave edge of the first subpixel electrode 191b are connected to the curved portions of the cutouts 72 and 73 bisecting the base electrodes of the second subpixel electrode 191b. In other words, the curved edges of the subpixel electrodes 191a and 191b or the curved portions of the cutouts 92 in a subpixel row may be connected to the curved portions of the cutouts 71-73 of the common electrode CE in a subpixel row adjacent thereto.

Alternatively, as shown in FIG. 4, the convex edge of the first subpixel electrode 191b is connected to the convex edge of the second subpixel electrode 191b or to the curved portion of the cutout 92 bisecting the second subpixel electrode 191b, and the concave edge of the first subpixel electrode 191b is connected to the curved portion of the cutout 92 of the second subpixel electrode 191b or to the concave edge of the second subpixel electrode 191b. In other words, the curved portions of the subpixel electrodes 191a and 191b or the curved portions of the cutouts in adjacent subpixel columns may be connected to each other, and the curved portions of the cutouts 71-73 of the common electrode CE in adjacent subpixel columns may be connected to each other.

As shown in FIG. 3, the first subpixel electrode 191b and the second subpixel electrode 191b are aligned at a center thereof, and the data lines 171 are regularly arranged in a predetermined period. In FIG. 4, since the first subpixel electrode 191b and the second subpixel electrode 191b having a length ratio of about 1:2 are aligned with each other alternately at left and right edges, the distance between the data lines 171 varies at a ratio of about 1:2.

In an exemplary embodiment of the present invention shown in FIG. 5, one of the first and the second subpixel electrodes 191a and 191b of each pixel electrode 191 shown in FIG. 3 is divided into a pair of electrode parts 191a1 and 191a2 (or 191b1 and 191b2) disposed above and below the other of the first and the second subpixel electrodes 191a and 191b. In addition, each of the cutouts 71-73 corresponding to the divided one of the subpixel electrodes 191a and 191b is divided into cutout pieces 74 and 75, 76 and 77, or 78 and 79 disposed at corresponding positions. A pair of the electrode parts 191a1 and 191a2 (or 191b1 and 191b2) are electrically connected to each other.

Each of the electrode parts 191a1, 191a2, 191b1 and 191b2 and each of the cutout pieces 74-79 may be obtained by dividing the subpixel electrodes 191a and 191b shown in FIG. 3 along the transverse cutouts 91 and 93 or along the center transverse line connecting the transverse portions of the cutout 92.

Each of the electrode parts 191a1, 191a2, 191b1 and 191b2 has a shape of nearly a parallelogram having a pair of transverse edges extending substantially parallel to each other and a pair of oblique edges extending substantially parallel to each other. The transverse cutouts 91 and 93 or the transverse portions of the cutout 92 extending along the dividing lines form boundaries of the electrode parts 191a1, 191b1, 191a2 and 191b2. Two oblique portions forming the curved portion of the cutout 92, which are divided by the dividing line, form oblique cutout pieces 94 and 95. Each of the cutout pieces 74-79 of the common electrode CE which are divided by the dividing lines includes an oblique portion and transverse portions connected to the ends of the oblique portion. The transverse portions of the cutout pieces 74-79 make obtuse angles with the oblique portion, extending along the transverse edges of the electrode parts 191a1, 191a2, 191b1 and 191b2, overlapping the transverse edges of the electrode parts 191a1, 191a2, 191b1 and 191b2.

The exemplary embodiment of the present invention shown in FIGS. 7A and 7B are substantially the same as those shown in FIGS. 3 and 5, respectively, except that the sub-areas of the second subpixel electrode 191b have different sizes. Referring to the figures, two inner sub-areas SA1 among four sub-areas arranged in the row direction have a width L1 smaller than a width L2 of two outer sub-areas SA2.

The width L1 of the inner sub-areas SA1 may be equal to about 20 microns to about 30 microns, while the width L2 of the inner sub-areas SA2 may be equal to about 30 microns to about 40 microns.

In the above-described arrangements, the first and the second subpixel electrodes 191a and 191b are arranged in the row or column direction, for example, to balance over all arrangements, and the subpixel electrodes 191a and 191b having an areal ratio of about 1:2 are well organized and may increase aperture ratio.

The color filters 230R, 230G and 230B have equal area, for example, to facilitate the balance of the colors.

Hereinafter, operations of the above-described LCDs shown in FIGS. 1-7B will be described in detail.

The signal controller 600 is supplied with input image signals R, G and B and input control signals controlling the display thereof from an external graphics controller (not shown). The input image signals R, G and B contains luminance information of each pixel PX, and the luminance has a predetermined number of grays, such as for example, 1024 ($=2^{10}$), 256($=2^8$) or 64($=2^6$). The input control signals include a vertical synchronization signal Vsync, a horizontal synchronization signal Hsync, a main clock MCLK, and a data enable signal DE, etc.

After generating the gate control signals CONT1 and the data control signals CONT2 and processing the input image signals R, G and B suitable for the operations of the panel assembly 300 and the data driver 500 on the basis of the input control signals and the input image signals R, G and B, the signal controller 600 transmits the gate control signals CONT1 to the gate driver 400, and the processed image signals DAT and the data control signals CONT2 to the data driver 500. The output image signals DAT are digital signals having a predetermined number of values (or grays).

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of subpixels, a load signal LOAD for instructing to apply the data voltages to the panel assembly 300, and a data clock signal HCLK. The data control signal CONT2 may further include an inversion signal RVS for reversing the polarity of the data voltages (with respect to the common voltage Vcom).

Responsive to the data control signals CONT2 from the signal controller 600, the data driver 500 receives a packet of the image data DAT for the group of subpixels from the signal controller 600. The data driver 500 converts the image data DAT into analog data voltages selected from the gray voltages supplied from the gray voltage generator 800, and applies the data voltages to the data lines.

The gate driver 400 applies the gate-on voltage Von to the gate line in response to the gate control signals CONT1 from the signal controller 600, thereby turning on the switching elements connected thereto. The data voltages applied to the data lines are supplied to the subpixels through the activated switching elements.

Referring to FIGS. 3-7B, when the first subpixel electrode 191a and the second subpixel electrode 191b forming a pixel electrode 191 are coupled to respective switching elements, for example, when each of the subpixels includes its own switching element, the two subpixels may be supplied with respective data voltages at different times through the same data line or through different data lines, or at substantially the same time through different data lines. However, when the first subpixel electrode 191a is coupled to a switching element (not shown) and the second subpixel electrode 191b is capacitively coupled to the first subpixel electrode 191a, one subpixel including the first subpixel electrode 191a may be directly supplied with data voltages through the switching elements, while the other subpixel including the second subpixel electrode 191b may have a voltage that varies depending on the voltage of the first subpixel electrode 191a. The first subpixel electrode 191a having a relatively small area may have a voltage (relative to the common voltage) that is greater than the second subpixel electrode 191b having a relatively large area.

On the other hand, after two subpixel electrodes 191a and 191b are charged with the same voltage, the voltages of the subpixel electrodes 191a and 191b may be differentiated from each other by using storage capacitors (not shown), etc.

When the voltage difference is generated between two terminals of the LC capacitor Clc1/Clc2, a primary electric field substantially perpendicular to the surfaces of the panels 100 and 200 is generated in the LC layer 3 and both the pixel electrodes PE and the common electrode CE are commonly referred to as field generating electrodes. The LC molecules in the LC capacitor Clc1/Clc2 tend to change their orientations in response to the electric field so that their longitudinal axes may be perpendicular to the field direction. The molecular orientations determine the polarization of light passing through the LC layer 3. The polarizer(s) converts the light polarization into the light transmittance such that the pixels PX display the luminance represented by the image signal DAT.

The tilt angle of the LC molecules depends on the strength of the electric field. Since the voltages of the LC capacitors Clc1 and Clc2 are different from each other, the tilt angles of the LC molecules in the subpixels are different from each other, and thus the luminances of the two subpixels are different. The voltages of the two subpixels can be adjusted so that an image viewed from a lateral side is the closest to an image viewed from the front, that is, a lateral gamma curve is the closest to the front gamma curve, improving the lateral visibility.

The area of the subpixel electrode 191a having a voltage (relative to the common voltage Vcom) higher than that of the second subpixel electrode 191b may have an area smaller than that of the second subpixel electrode 191b, such that the lateral gamma curve further approaches the front gamma curve. For example, when the ratio of the areas of the first subpixel electrode 191a and the second subpixel electrode 191b is equal to about 1:2, the lateral gamma curve further approaches the front gamma curve to further improve the lateral visibility.

The tilt direction of the LC molecules is firstly determined by a horizontal field component. The horizontal field component is generated by the cutouts 71-73 and 91-93 and the cutout pieces 94 and 95 (cutout pieces 94 and 95 may also be referred to as cutouts) of the field generating electrodes 191 and CE and the edges of the subpixel electrodes 191a and 191b, and the electrode parts 191a1, 191a2, 191b1 and 191b2 (electrode parts 191a1, 191a2, 191b1 and 191b2 may also be referred to as subpixel electrodes) which distort the primary electric field. The horizontal field component is substantially perpendicular to the edges of the cutouts 71-79 and 91-95, and substantially perpendicular to the edges of the subpixel electrodes 191a, 191b, 191a1, 191a2, 191b1 and 191b2.

Referring to FIGS. 3-7B, since the LC molecules on each of the sub-areas divided by a set of the cutouts 71-79 and 91-95 tilt perpendicular to the major edges of the sub-area, the azimuthal distribution of the tilt directions are localized to four directions, increasing the reference viewing angle of the LCD.

The width of the sub-areas, i.e., the distance between the oblique portions of the cutouts 71-79 of the common electrode CE and the oblique edges of the subpixel electrodes 191a, 191b, 191a1, 191a2, 191b1 and 191b2, or the distance between the cutouts 91-95 is may be equal to about 25 microns to about 40 microns, as described above, such that the horizontal component of the primary electric field can be suitably used and the decrease of the aperture ratio caused by the cutouts 71-79 and 91-95 can be reduced.

The direction of a secondary electric field due to the voltage difference between adjacent pixel electrodes 191 is perpendicular to the major edges of the sub-areas. Accordingly, the field direction of the secondary electric field coincides with that of the horizontal component of the primary electric field. The secondary electric field between the adjacent pixel electrodes 191 enhances the determination of the tilt directions of the LC molecules. Accordingly, the control of the LC molecules may be enhanced and the delay of the response time caused by the increase of textures under the increase of the width of the sub-areas may be prevented.

The inner sub-areas in the second subpixel electrode 191b, 191b1 and 191b2 are far from the boundaries of the pixel electrode 191 and thus are less affected by the secondary electric field. The structures shown in FIGS. 7A and 7B, wherein the width L1 of the inner sub-areas SA1 is smaller than the width L2 of the outer sub-areas SA2, properly control the LC molecules in both the inner sub-areas SA1 and the outer sub-areas SA2.

By repeating this procedure by a unit of a horizontal period (which is denoted by "1H" and equal to one period of the horizontal synchronization signal Hsync or the data enable signal DE), all the pixels PX are supplied with data voltages.

When the next frame starts after one frame finishes, the inversion control signal RVS applied to the data driver 500 is controlled such that the polarity of the data voltages is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

Among the above-described inversion types, the dot inversion, etc., reverses the polarities of the data voltages of adjacent data lines and repeatedly reverses the polarity of each data line between the positive and the negative. In FIGS. 3 and 4, the data voltages of the left and right data lines 171 have positive polarity, while the data voltage of the middle data line 171 has negative polarity. However, their polarity will be reversed soon and the reverse of the polarity will be repeated.

On the other hand, a pixel electrode 191 and a data line 171 adjacent thereto form a parasitic capacitance that varies the voltage of the pixel electrode 191. For examples, the voltage of the pixel electrode 191 rises as the voltage of the data line 171 rises, while the voltage of the pixel electrode 191 drops as the voltage of the data line 171 drops. Therefore, when the voltage of the data line 171 changes from the negative polarity to the positive polarity, the voltage of the pixel electrode 191 increases. Conversely, when the voltage of the data line 171 changes from the positive polarity to the negative polarity, the voltage of the pixel electrode 191 decreases. Since a pixel electrode 191 overlaps two data lines 171 having opposite polarity voltages as shown in FIGS. 3 and 4, the parasitic capacitance between the pixel electrodes 191 and one of the two data lines 171 raises the voltage of the pixel electrode 191, while the parasitic capacitance between the pixel electrode 191 and the other of the data lines 171 lowers the voltage of the pixel electrode 191.

The voltage variation of the pixel electrode 191 depends on the parasitic capacitance between the pixel electrode 191 and the data line 171, and the parasitic capacitance is proportional to an overlapping area between the pixel electrode 191 and the data line 171.

Although each of the pixel electrodes 191 shown in FIGS. 3 and 4 overlaps two data lines 171, the overlapping areas between the pixel electrode 191 and the two data lines 171 approach each other more in FIG. 3 as compared to in FIG. 4, such that the voltage rise and the voltage drop caused by the parasitic capacitances are nearly cancelled to reduce the voltage variation of the pixel electrode 191.

The voltage across the LC capacitor Clc1 or Clc2 forces the LC molecules in the LC layer 3 to be reoriented into a stable state corresponding to the voltage. The reorientation of the LC molecules takes time since the response time of the LC molecules is slow. The LC molecules continue to reorient themselves to vary the light transmittance (or the luminance) until they reach the stable state on the condition that the application of the voltage across the LC capacitor Clc1 or Clc2 is maintained. When the LC molecules reach the stable state and the reorientation stops, the light transmittance becomes fixed.

A pixel voltage in such a stable state is referred to as a target pixel voltage, and a light transmittance in the stable state is referred to as a target light transmittance. The target pixel voltage and the target light transmittance have one-to-one correspondence.

Actually, since the time for turning on the switching element of each pixel PX to apply a data voltage to the pixel is limited, it is difficult for the LC molecules in the pixel PX to reach the stable state during the application of the data voltage. However, even though the switching element is turned off, the voltage across the LC capacitor Clc1 or Clc2 still exists and thus the LC molecules continue the reorientation such that the capacitance of the LC capacitor Clc1 or Clc2 changes. Ignoring leakage current, the total amount of electrical charges stored in the LC capacitor Clc1 or Clc2 is kept constant when the switching element turns off since one terminal of the LC capacitor Clc1 or Clc2 is floating. Therefore, the variation of the capacitance of the LC capacitor Clc1 or Clc2 results in the variation of the voltage across the LC capacitor Clc1 or Clc2, i.e., the pixel voltage.

Consequently, when a pixel PX is supplied with a data voltage corresponding to a target pixel voltage (referred to as a "target data voltage" hereinafter), which is determined in the stable state, an actual pixel voltage of the pixel PX may be different from the target pixel voltage such that the pixel PX may not reach a corresponding target light transmittance. The actual pixel voltage differs from the target pixel voltage as the target transmittance differs from a light transmittance that the subpixel initially has.

Accordingly, a data voltage applied to the pixel PX is required to be higher or lower than a target data voltage and, for example, this can be realized by DCC (dynamic capacitance compensation).

DCC, which may be performed by the signal controller 600 or a separate image signal modifier, modifies an image signal of a frame (referred to as a "current image signal" hereinafter) for a subpixel to generate a modified current image signal (referred to as a "modified (current) image signal" hereinafter) based on an image signal of an immediately previous frame (referred to as a "previous image signal" hereinafter) for the subpixel. The modified image signal may be obtained by experiments, and the difference between the modified current image signal and the previous image signal is usually larger than the difference between the current image signal before modification and the previous image signal. However, when the current image signal and the previous image signal are equal to each other or the difference therebetween is small, the modified image signal may be equal to the current image signal (that is, the current image signal may not be modified).

In this way, the data voltages applied to the subpixels by the data driver 500 are higher or lower than the target data voltages.

However, the target transmittance may not be obtained by the above-described method. In the case of target transmittance, a predetermined voltage (referred to as a pre-tilt voltage hereinafter) is pre-applied to the subpixel to pre-tilt the LC molecules and then, a primary voltage is applied to the subpixel.

For this purpose, the signal controller 600 or an image signal modifier modifies a current image signal in consideration of an image signal of the next frame (referred to as a "next image signal" hereinafter) as well as a previous image signal. For example, if the next image signal is very different from the current image signal although the current image signal is equal to the previous image signal, the current image signal is modified to prepare the next frame.

The modification of the image signals and the data voltages may or may not be performed for the highest gray or the lowest gray. In order to modify the highest gray or the lowest gray, the range of the gray voltages generated by the gray voltage generator 800 may be widened as compared with the range of the target data voltages required for obtaining the range of the target luminance (or the target transmittance) represented by the grays of the image signals.

The application of DCC to the LCD according to an exemplary embodiment of the present invention reduces the response time of the liquid crystal so that the width of the sub-areas may be enlarged to increase the aperture ratio.

Hereinafter, a structure of a LC panel assembly according to an exemplary embodiment of the present invention will be described in detail with reference to FIGS. 1, 2, 5, 8, 9 and 10.

Figure 8:
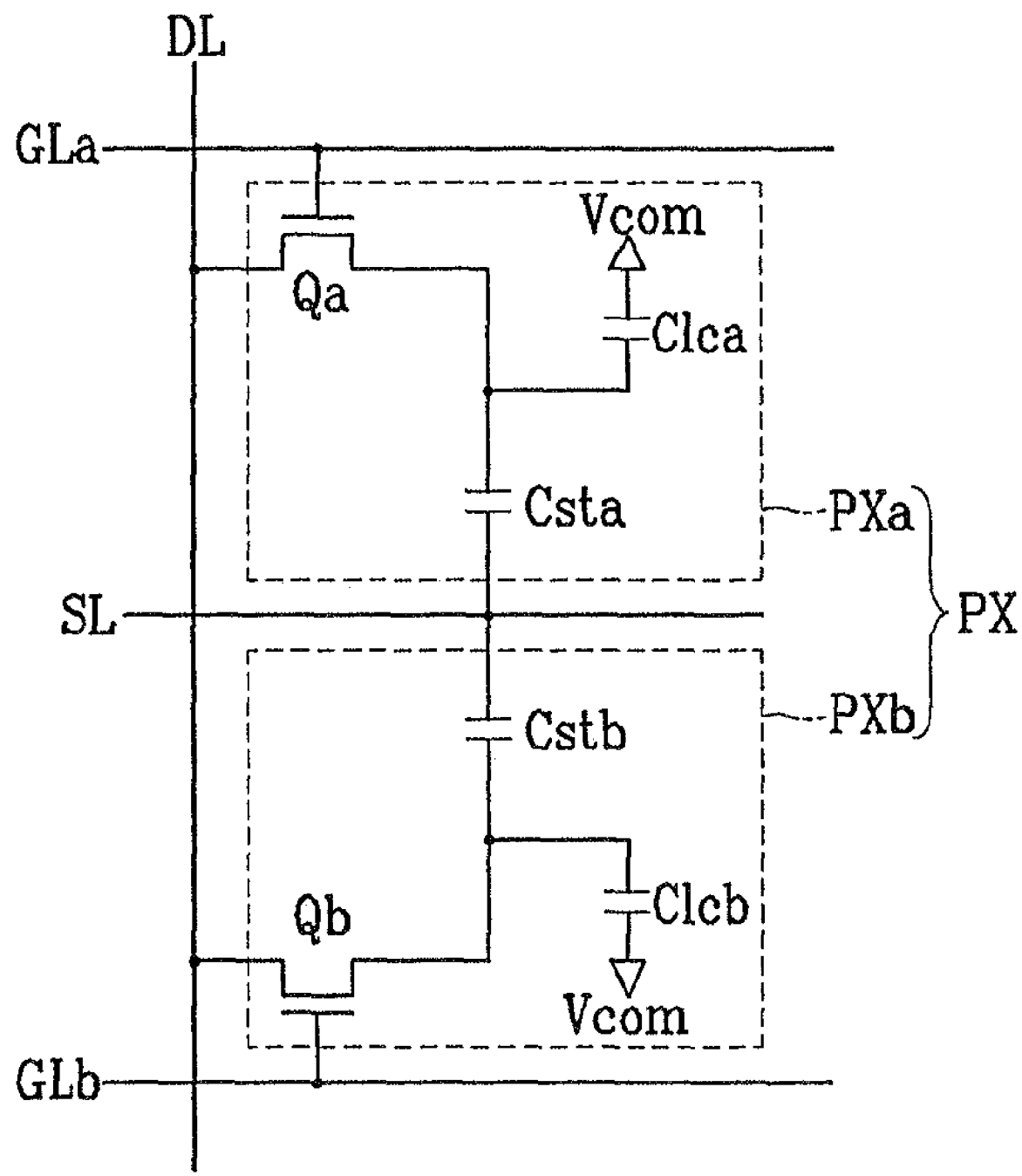
FIG. 8 is an equivalent circuit diagram of signal lines and a pixel of an LCD according to an exemplary embodiment of the present invention.

FIG. 8 is an equivalent circuit diagram of signal lines and a pixel of an LCD according to an exemplary embodiment of the present invention.

The LC panel assembly shown in FIG. 8 includes a plurality of signal lines and a plurality of pixels PX connected thereto. The signal lines include a plurality of pairs of gate lines GLa and GLb, a plurality of data lines DL, and a plurality of storage electrode lines SL extending substantially parallel to the gate lines GLa and GLb.

Each pixel PX includes a pair of subpixels PXa and PXb. Each subpixel PXa/PXb includes a switching element Qa/Qb connected to one of the gate lines GLa and GLb and one of the data lines DL, a LC capacitor Clca/Clcb coupled to the switching element Qa/Qb, and a storage capacitor Csta/Cstb connected between the switching element Qa/Qb and the storage electrode line SL.

The switching element Qa/Qb such as a thin film transistor (TFT) is provided on the lower panel 100 and may include three terminals: a control terminal connected to a gate line GLa/GLb; an input terminal connected to a data line DL; and an output terminal connected to the LC capacitor Clca/Clcb and the storage capacitor Csta/Cstb.

The storage capacitor Csta/Cstb is an auxiliary capacitor for the LC capacitor Clca/Clcb. The storage capacitor Csta/

Cstb includes a subpixel electrode and a separate signal line, which is provided on the lower panel 100, overlapping the subpixel electrode via an insulator, and is supplied with a predetermined voltage such as the common voltage Vcom. Alternatively, the storage capacitor Csta/Cstb includes the subpixel electrode and an adjacent gate line called a previous gate line, which overlaps the pixel electrode via an insulator.

Since the LC capacitor Clca/Clcb is described above with reference to FIG. 2, further description thereof will be omitted.

In the LCD shown in FIG. 8, the signal controller 600 receives input image data R, G and B and converts each input image data R, G and B for each pixel into a plurality of output image data DAT for two subpixels PXa and PXb to be supplied to the data driver. Otherwise, the gray voltage generator 800 generates separate groups of gray voltages for two subpixels PXa and PXb. The two groups of gray voltages are alternately supplied by the gray voltage generator 800 to the data driver 500 or alternately selected by the data driver 500 such that the two subpixels PXa and PXb are supplied with different voltages.

The values of the converted output image signals and the values of the gray voltages in each group may be determined such that the synthesis of gamma curves for the two subpixels PXa and PXb approaches a reference gamma curve at a front view. For example, the synthesized gamma curve at a front view coincides with the most suitable reference gamma curve at a front view, and the synthesized gamma curve at a lateral view is the most similar to the reference gamma curve at a front view.

An example of an LC panel assembly shown in FIG. 8 according to an exemplary embodiment of the present invention will be described in detail with reference to FIGS. 9 and 10.

Figure 9:
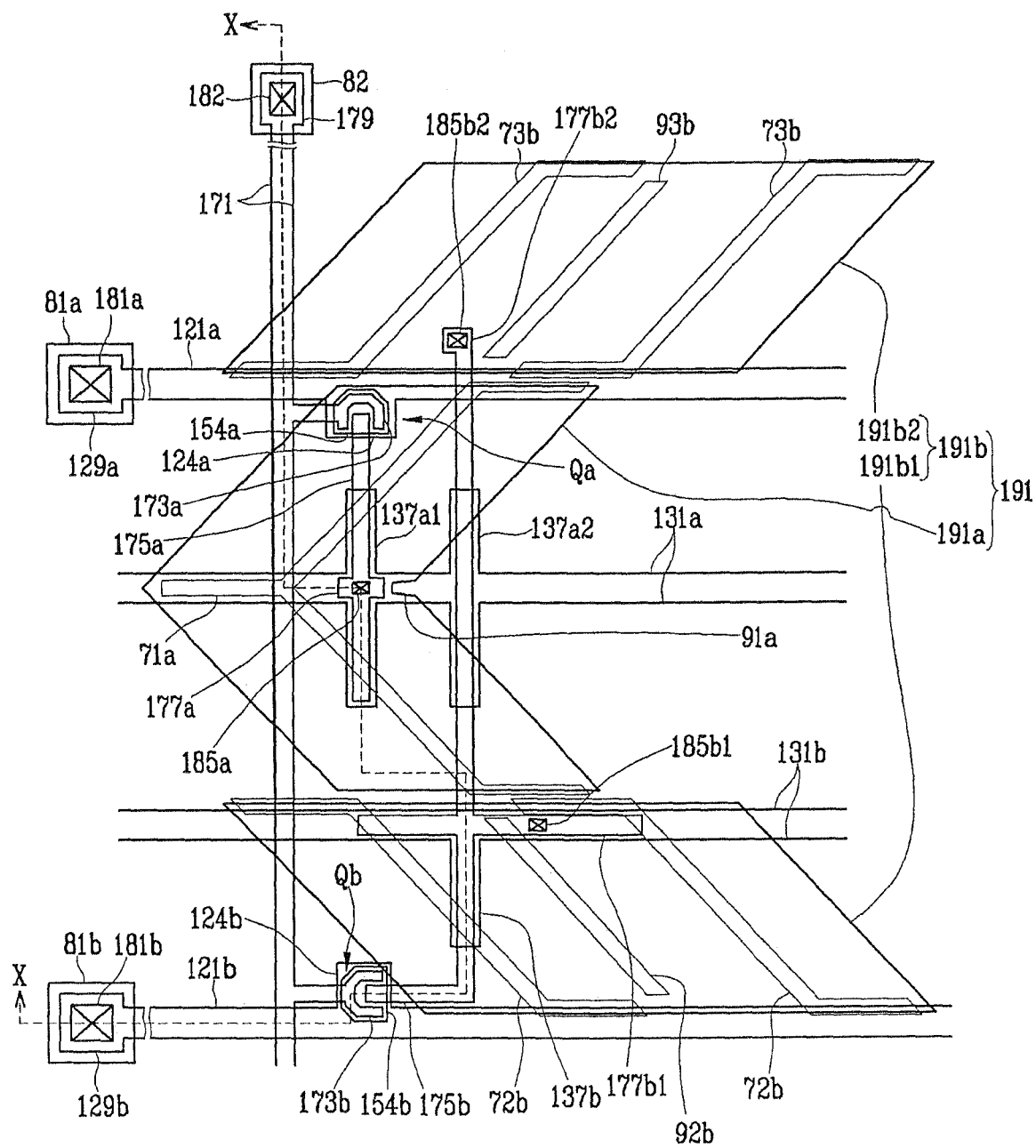
FIG. 9 is a layout view of a LC panel assembly according to an exemplary embodiment of the present invention.
Figure 10:
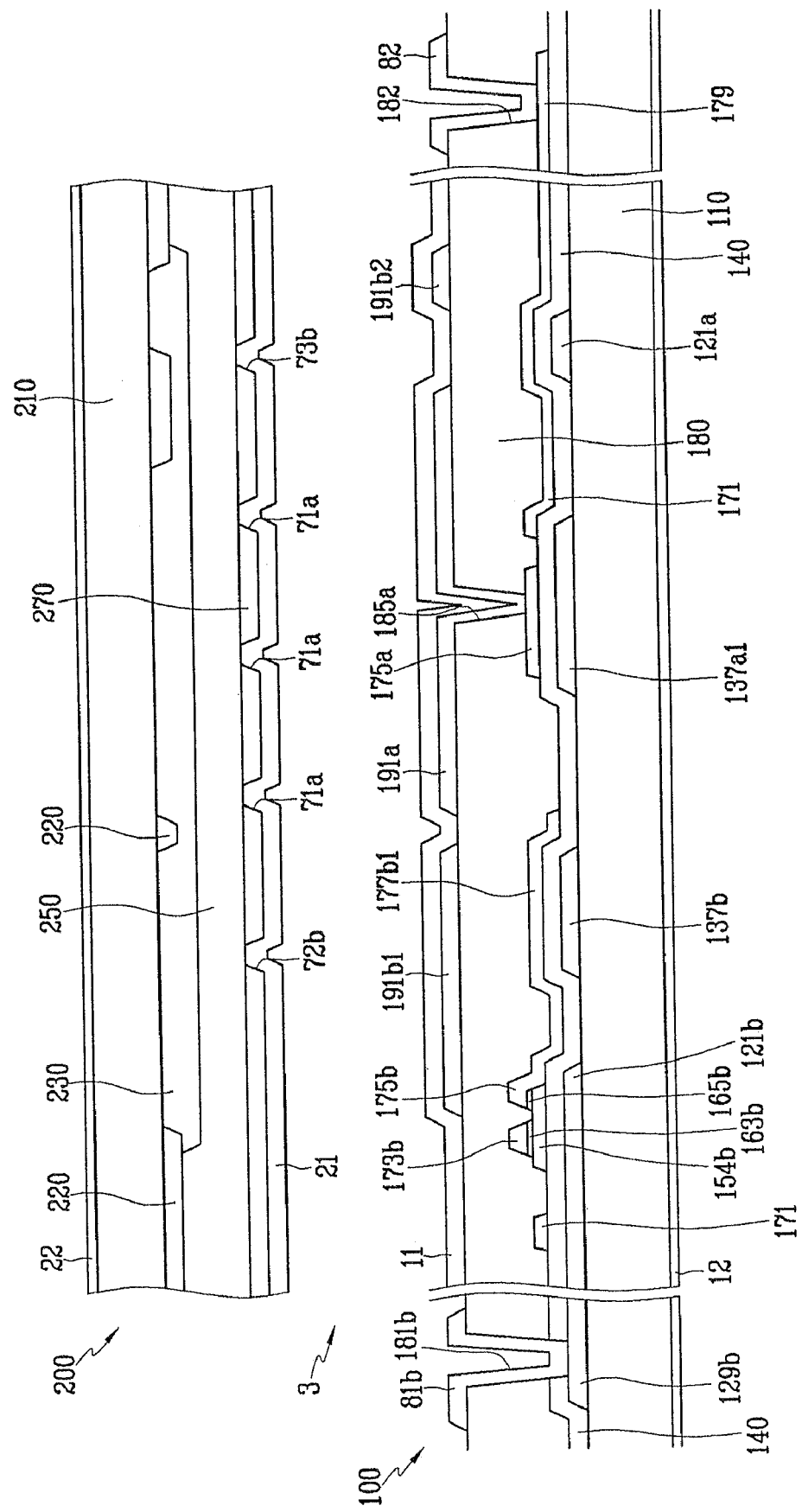
FIG. 10 is a sectional view of the LC panel assembly shown in FIG. 9 taken along line X-X.

FIG. 9 is a layout view of a LC panel assembly according to an exemplary embodiment of the present invention, and FIG. 10 is a sectional view of the LC panel assembly shown in FIG. 9 taken along line X-X.

Referring to FIGS. 9 and 10, an LC panel assembly includes a lower panel 100, an upper panel 200 facing the lower panel 100, and a LC layer 3 interposed between the panels 100 and 200.

First, the lower panel 100 will be described.

A plurality of gate conductors including a pair of first and second gate lines 121a and 121b and a pair of first and second storage electrode lines 131a and 131b are formed on an insulating substrate 110 such as transparent glass or plastic.

The gate lines 121a and 121b transmit gate signals, extend substantially in a transverse direction, and are disposed at relatively upper and lower positions, respectively.

The first gate line 121a includes a first gate electrode 124a extending downward and an end portion 129a having a large area for contact with another layer or an external driving circuit. The second gate line 121b includes a second gate electrode 124b extending toward upward and an end portion 129b having a large area for contact with another layer or an external driving circuit. The gate lines 121a and 121b may extend to be connected to a gate driver 400 that may be integrated on the substrate 110.

The first and the second storage electrode lines 131a and 131b are supplied with a predetermined voltage such as the common voltage Vcom and include stems extending substantially parallel to the gate lines 121a and 121b and a plurality of storage electrodes 137a1, 137a2 and 137b branching from the stems.

Each of the first and the second storage electrode lines 131a and 131b is disposed between the first gate line 121a and the second gate line 121b. The stem of the first storage electrode line 131a is closer to the first gate line 121a than the second gate line 121b, while the stem of the second storage electrode line 131b is closer to the second gate line 121b than the second gate line 121a. The distance between the first/second gate line 121a/121b and the first/second storage electrode line 131a/131b adjacent thereto is nearly equal to the distance between the first storage electrode line 131a and the second storage electrode line 131b adjacent thereto.

The first storage electrode line 131a includes a pair of first and second storage electrodes 137a1 and 137a2 extending upward and downward. The second storage electrode line 131b includes a third storage electrode 137b extending downward and coinciding with the second storage electrode 137a2. However, the storage electrode lines 131a and 131b may have various shapes and arrangements.

The gate conductors 121a, 121b, 131a and 131b may be made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films may be made of a low resistivity metal including, for example, an Al containing metal, an Ag containing metal, and an Cu containing metal for reducing signal delay or voltage drop. The other film may be made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121a, 121b, 131a and 131b may be made of various metals or conductors.

The lateral sides of the gate conductors 121a, 121b, 131a and 131b are inclined relative to a surface of the substrate, and the inclination angle thereof ranges about 30-80 degrees.

A gate insulating layer 140 that may comprise silicon nitride (SiNx) or silicon oxide (SiOx) is formed on the gate conductors 121a, 121b, 131a and 131b.

First and second semiconductor islands 154a and 154b that may be made of hydrogenated amorphous silicon (abbreviated to "a-Si") or polysilicon are formed on the gate insulating layer 140. The first/second semiconductor island 154a/154b is disposed on the first/second gate electrode 124a/124b.

A pair of ohmic contact islands 163b and 165b are formed on the semiconductor island 154b, and a pair of ohmic contact islands (not shown) are formed on the semiconductor island 154a. The ohmic contact islands 163b and 165b may be made of n+ hydrogenated a-Si heavily doped with n type impurity such as phosphorous or they may be made of silicide.

The lateral sides of the semiconductor islands 154a and 154b and the ohmic contacts 163b and 165b are inclined relative to the surface of the substrate 110, and the inclination angles thereof may be in a range of about 30 degrees to about 80 degrees.

A plurality of data conductors including a data line 171 and a pair of first and second drain electrodes 175a and 175b are formed on the ohmic contacts 163b and 165b and the gate insulating layer 140.

The data line 171 transmits data signals and extends substantially in the longitudinal direction to intersect the gate lines 121a and 121b and the storage electrode lines 131a and 131b. The data line 171 includes first and second source electrodes 173a and 173b extending toward the first and the second gate electrodes 124a and 124b, respectively, and curved like a character U or C. The data line 171 further includes an end portion 179 having a large area for contact with another layer or an external driving circuit. The data line 171 may extend to be connected to a data driver 500 that may be integrated on the substrate 110.

The first and the second drain electrodes 175a and 175b are separated from each other and separated from the data line 171. The first/second drain electrode 175a/175b is disposed opposite the first/second source electrode 173a/173b with respect to the first/second gate electrode 124a/124b.

The first drain electrode 175a starts from an end thereof enclosed by the first source electrode 173a and extends downward along the first storage electrode 137a1. The first drain electrode 175a includes an expansion 177a extending left and right along the first storage electrode line 131a near the intersection with the first storage electrode line 131a.

The second drain electrode 175b starts from an end thereof enclosed by the second source electrode 173b, extends upward along the third storage electrode 137b and the second storage electrode 137a2, and ends after crossing the first gate line 131a. The second drain electrode 175b includes an expansion 177b1 extending left and right along the second storage electrode line 131b near the intersection with the second storage electrode line 131b and further includes a wide end portion 177b2.

The first/second gate electrode 124a/124b, the first/second source electrode 173a/173b, and the first/second drain electrode 175a/175b along with the first/second semiconductor island 154a/154b form a first/second TFT Qa/Qb having a channel formed in the first/second semiconductor island 154a/154b disposed between the first/second source electrode 173a/173b and the first/second drain electrode 175a/175b.

The data conductors 171, 175a and 175b may be made of refractory metals such as Cr, Mo, Ta, Ti, or alloys thereof. It is to be understood that the data conductors 171, 175a and 175b may have a multilayered structure including a refractory metal film (not shown) and/or a low resistivity film (not shown). For example, the multi-layered structure may comprise a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171, 175a and 175b may be implemented using various metals or other conductive materials.

The data conductors 171, 175a and 175b may have inclined edge profiles. For example, the inclination angles thereof may be in a range about 30 degrees to about 80 degrees.

The ohmic contacts 163b and 165b are interposed only between the underlying semiconductor islands 154a and 154b and the overlying data conductors 171, 175a and 175b thereon and reduce the contact resistance therebetween. The semiconductor islands 154a and 154b include some exposed portions, which are not covered with the data conductors 171, 175a and 175b, that are located between the source electrodes 173a and 173b and the drain electrodes 175a and 175b.

A passivation layer 180 is formed on the data conductors 171, 175a and 175b and the exposed portions of the semiconductor islands 154a and 154b. The passivation layer 180 may comprise an inorganic or organic insulator and it may have a flat top surface. Examples of the inorganic insulator include silicon nitride and silicon oxide. The organic insulator may have photosensitivity and dielectric constant less than about 4.0. The passivation layer 180 may include a lower film of inorganic insulator and an upper film of organic insulator such that it takes the insulating characteristics of the organic insulator while preventing the exposed portions of the semiconductor islands 154a and 154b from being damaged by the organic insulator.

The passivation layer 180 has a contact hole 182 exposing the end portion 179 of the data line 171, a contact hole 185a exposing the expansion 177a of the first drain electrode 175a, and contact holes 185b1 and 185b2 exposing the expansion 177b1 and the end portion 177b2 of the second drain electrode 175b. The passivation layer 180 and the gate insulating layer 140 have contact holes 181a and 181b exposing the end portions 129a and 129b of the gate lines 121a and 121b.

A pixel electrode 191 and a plurality of contact assistants 81a, 81b and 82 are formed on the passivation layer 180. The pixel electrode 191 and a plurality of contact assistants 81a, 81b and 82 may comprise a transparent conductor such as ITO, IZO, or reflective conductor such as Ag, Al, Cr, or alloys thereof.

The pixel electrode 191 includes a pair of first and second subpixel electrodes 191a and 191b, and the second subpixel electrode 191b includes lower and upper electrode parts 191b1 and 191b2. The first subpixel electrode 191a has a cutout 91a, and the lower/the upper electrode part 191b1/191b2 has a cutout 92b/93b.

The first subpixel electrode 191a is physically and electrically connected to the first drain electrode 175a through the contact hole 185a. The second subpixel electrode 191b is physically and electrically connected to the second drain electrode 175b through the contact hole 185b.

The first storage electrode line 131a, the expansion 177a of the first drain electrode 175a, and the contact hole 185a lie on a straight line connecting curved points of the first subpixel electrode 191a. Similarly, the second storage electrode line 131b, the expansion 177b1 of the second drain electrode 175b, and the contact hole 185b1 are disposed near a boundary between the first subpixel electrode 191a and the lower electrode part 191b1. In addition, the first gate line 121a is disposed at a boundary between the first subpixel electrode 191a and the upper electrode part 191b2, and the second gate line 131b is disposed near a boundary of the pixel electrode 191. The line connecting the curved points of the first subpixel electrode 191a and the boundaries of the first and the second subpixel electrodes 191a and 191b form boundaries of the above-described sub-areas, and thus this configuration can cover texture that may be generated by the disorder of the LC molecules near the boundaries of the sub-areas, improving the aperture ratio.

Since other features of the pixel 191 are described above with reference to FIG. 5, the detailed description thereof will be omitted.

A subpixel electrode 191a or 191b and a common electrode 270 of the upper panel 200 along with a portion of the LC layer 3 disposed therebetween form a LC capacitor Clca or Clcb, which stores applied voltages after the TFT Qa or Qb turns off.

The first subpixel electrode 191a and the first drain electrode 175a connected thereto overlap the first storage electrode line 131a including the first storage electrode 137a1 with the gate insulating layer 140 interposed therebetween to form a first storage capacitor Csta. The second subpixel electrode 191b and the second drain electrode 175b connected thereto with the gate insulating layer 140 interposed therebetween overlap the second storage electrode 137a2 and the second storage electrode line 131b including the third storage electrode 137b to form a second storage capacitor Cstb. The storage capacitors Csta and Cstb enhance the charge storing capacity of the LC capacitors Clca and Clcb.

The storage electrode lines 131, the wide end portions 177a and 177b of the first and the second drain electrodes 175a and 175b, the contact holes 185a and 185b, and the second gate lines 121b are disposed near boundaries of adjacent rows of the unit electrodes. This configuration covers texture that appears near the boundaries due to the disorder of the molecular orientations, and increases the aperture ratio.

The contact assistants 81a, 81b and 82 are connected to the end portions 129a and 129b of the gate lines 121a and 121b and the end portion 179 of the data line 171 through the contact holes 181a, 181b and 182, respectively. The contact assistants 81a, 81b and 82 protect the end portions 129a, 129b and 179 and enhance the adhesion between the end portions 129a, 129b and 179 and external devices.

The description of the upper panel 200 follows.

A light blocking member 220 is formed on an insulating substrate 210 such as transparent glass or plastic. The light blocking member 220 may include curved portions (not shown) facing the curved edges of the pixel electrode 191 on the lower panel 100 and widened portions (not shown) facing the TFTs Qa and Qb on the lower panel 100. The light blocking member 220 preventing light leakage near the boundaries of the pixel electrode 191 and is also referred to as a black matrix. However, the light blocking member 220 may have other various shapes.

A color filter 230 is also formed on the substrate 210 and the light blocking member 220 and the color filter 230 is disposed substantially in the area enclosed by the light blocking member 220. The color filter 230 may extend substantially in the longitudinal direction along the pixel electrode 191. The color filter 230 may represent a primary color such as red, green, and blue.

An overcoat 250 is formed on the color filter 230 and the light blocking member 220. The overcoat 250 may be made of (organic) insulator and it prevents the color filter 230 from being exposed and provides a flat surface. The overcoat 250 may be omitted.

A common electrode 270 is formed on the overcoat 250. The common electrode 270 may be made of transparent conductive material such as ITO and IZO and has a plurality of cutouts 71a, 72b and 73b, which are described above with reference to FIG. 3.

The number of the cutouts 71a, 72b and 73b may be varied depending on the design factors, and the light blocking member 220 may also overlap the cutouts 71a, 72b and 73b to block the light leakage near the cutouts 71a, 72b and 73b.

Alignment layers 11 and 21 that may be homeotropic are coated on inner surfaces of the panels 100 and 200.

Polarizers 12 and 22 are provided on outer surfaces of the panels 100 and 200 so that their polarization axes may be crossed and the polarization axes may make about 45 degrees with the curved edges of the subpixel electrodes 191a and 191b for increasing light efficiency. One of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film, and the panels 100 and 200.

The LC layer 3 may have a negative dielectric anisotropy and be subjected to a vertical alignment.

The shapes and the arrangements of the cutouts 71a, 72b, 73b, 92b and 93b may be modified.

At least one of the cutouts 71a, 72b, 73b, 92b and 93b can be substituted with protrusions (not shown) or depressions (not shown). The protrusions may comprise an organic or inorganic material and disposed on or under the field generating electrode 191 or 270.

A structure of an LC panel assembly according to another exemplary embodiment of the present invention will be described in detail with reference to FIGS. 1, 2, 5, 11, 12 and 13.

Figure 11:
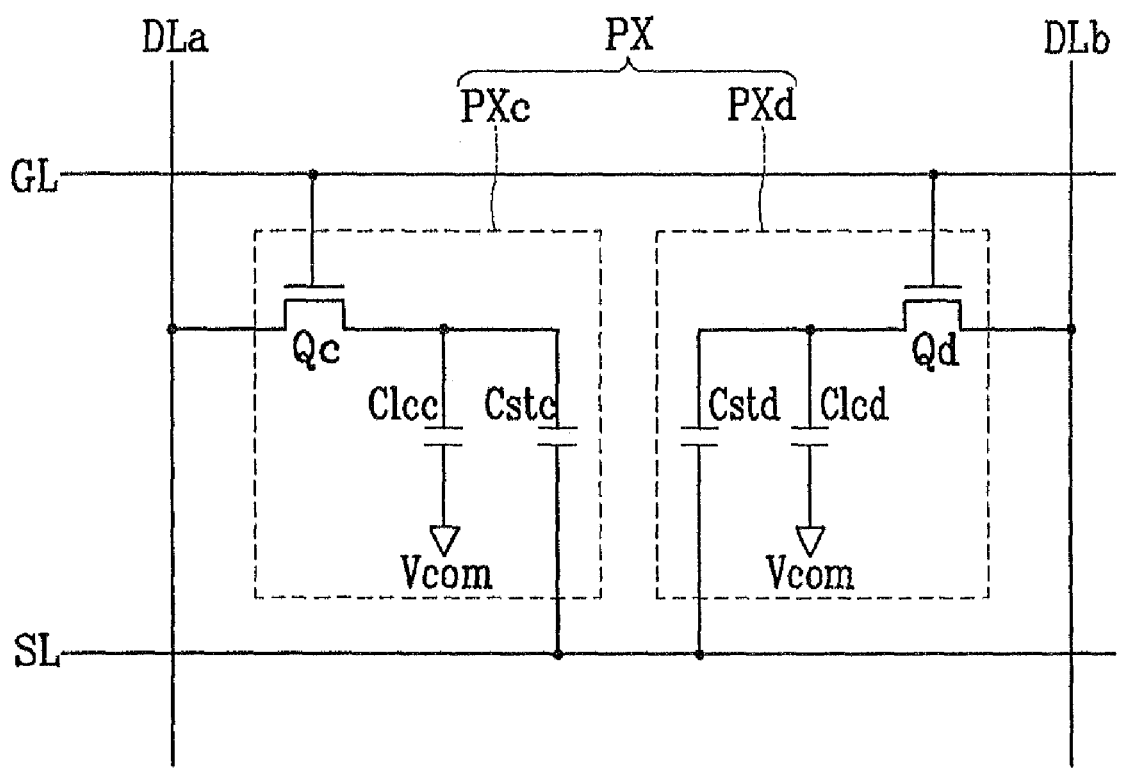
FIG. 11 is an equivalent circuit diagram of signal lines and a pixel of an LCD according to an exemplary embodiment of the present invention.

FIG. 11 is an equivalent circuit diagram of signal lines and a pixel of an LCD according to an exemplary embodiment of the present invention.

The LC panel assembly shown in FIG. 11 includes a plurality of signal lines and a plurality of pixels PX connected thereto. The signal lines include a plurality of gate lines GL, a plurality of pairs of data lines DLa and DLb, and a plurality of storage electrode lines SL.

Each pixel PX includes a pair of subpixels PXc and PXd. Each subpixel PXc/PXd includes a switching element Qc/Qd connected to one of the gate lines GL and one of the data lines DLa and DLb, a LC capacitor Clcc/Clcd coupled to the switching element Qc/Qd, and a storage capacitor Cstc/Cstd connected between the switching element Qc/Qd and the storage electrode line SL.

The switching element Qc/Qd such as a thin film transistor (TFT) is provided on the lower panel 100 and has three terminals: a control terminal connected to a gate line GL; an input terminal connected to a data line DLa/DLb; and an output terminal connected to the LC capacitor Clcc/Clcd.

Since the LC capacitor Clcc/Clcd, the storage capacitors Cstc and Cstd, and operations of the LCD including the panel assembly shown in FIG. 11 are substantially the same as those described above, further description thereof will be omitted. However, the two pixels PXc and PXd forming a pixel PX shown in FIG. 11 are supplied with data voltages at substantially the same time, unlike those shown in FIG. 8.

An example of a LC panel assembly shown in FIG. 11 according to an exemplary embodiment of the present invention will be described in detail with reference to FIGS. 12 and 13.

Figure 12:
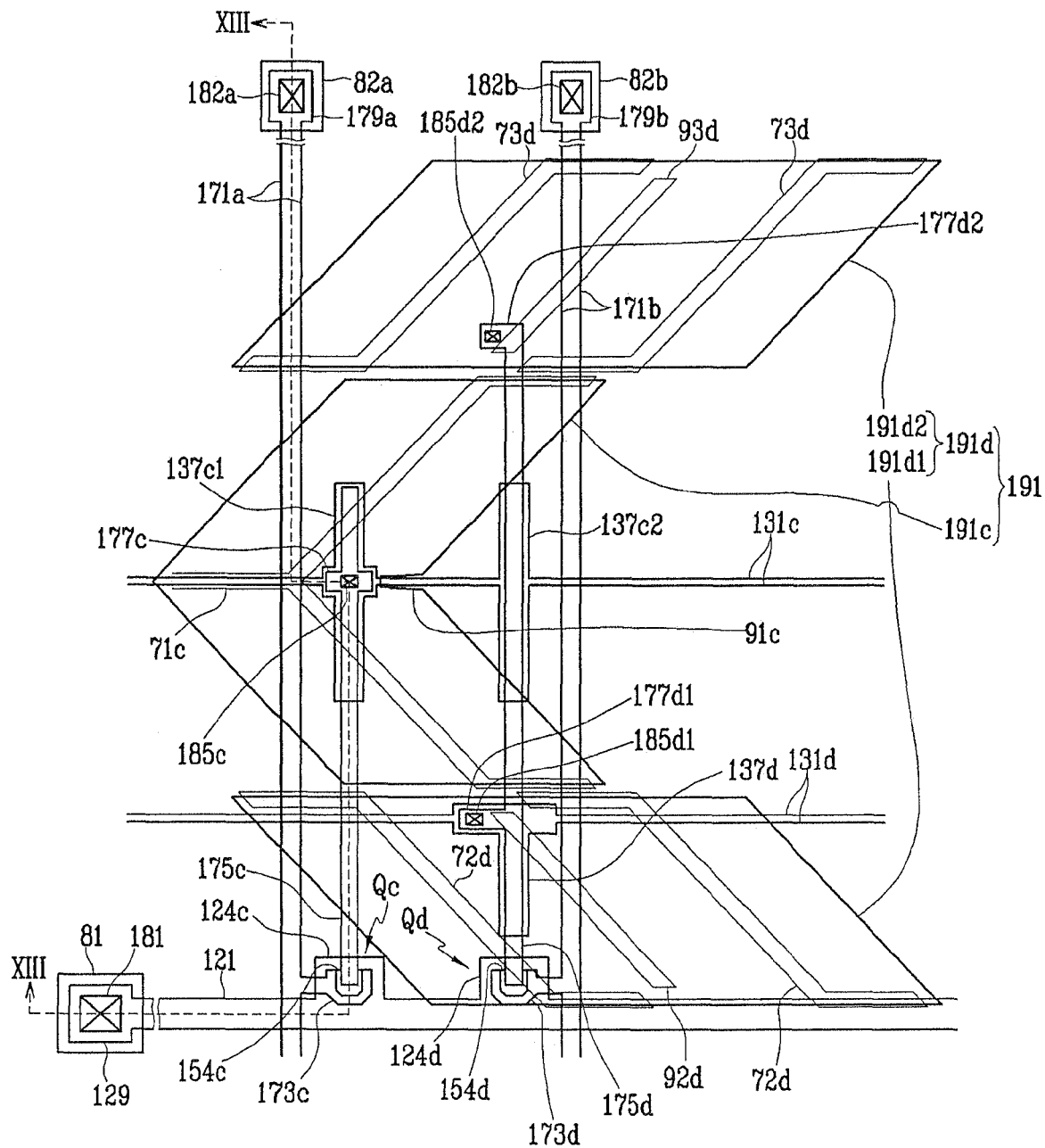
FIG. 12 is a layout view of an LC panel assembly according to an exemplary embodiment of the present invention.

FIG. 12 is a layout view of an LC panel assembly according to an exemplary embodiment of the present invention. FIG. 13 is a sectional view of the LC panel assembly shown in FIG. 12 taken along line XIII-XIII.

Figure 13:
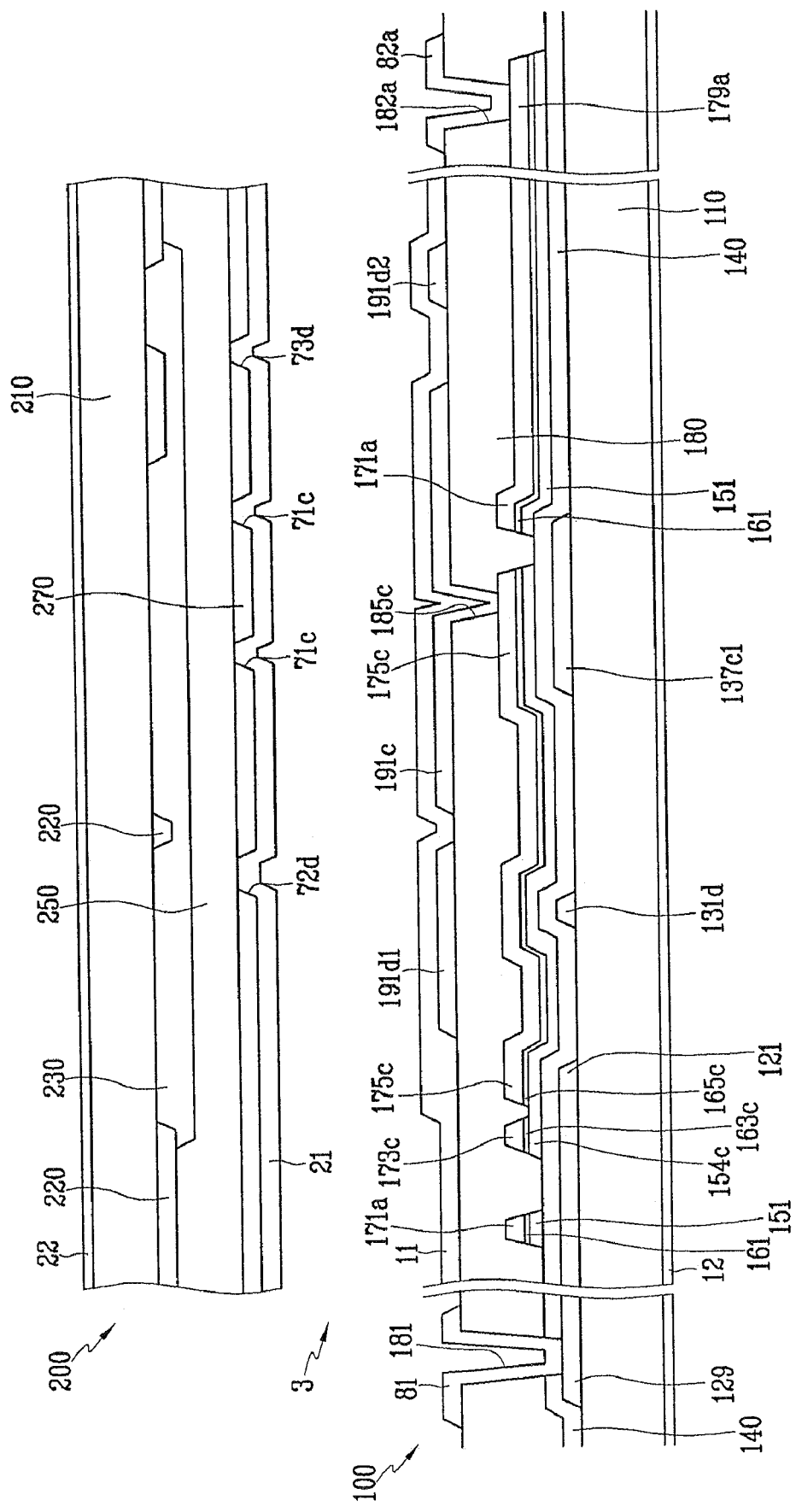
FIG. 13 is a sectional view of the LC panel assembly shown in FIG. 12 taken along line XIII-XIII.

Referring to FIGS. 12 and 13, an LC panel assembly includes a lower panel 100, an upper panel 200 facing the lower panel 100, a LC layer 3, and a pair of polarizers 12 and 22. Layered structures of the LC panel assembly shown in FIGS. 12 and 13 are substantially the same as those shown in FIGS. 9 and 10.

Regarding the lower panel 100, gate conductors including a gate line 121 and a pair of storage electrode lines 131c and 131d are formed on a substrate 110. The gate line 121 includes first and second gate electrodes 124c and 124d and an end portion 129. The first storage electrode line 131c includes first and second storage electrodes 137c1 and 137c2, and the second storage electrode line 131d includes a third storage electrode 137d. A gate insulating layer 140 is formed on the gate conductors 121, 131c and 131d, and a pair of semiconductor stripes 151 including first and second projections 154c and 154d are formed on the gate insulating layer 140. A pair of ohmic contact stripes 161 including projections 163c and an ohmic contact 165c are formed on the semiconductor stripes 151.

Data conductors including a pair of first and second data lines 171a and 171b and a pair of first and second drain electrodes 175c and 175d are formed on the ohmic contacts 161 and 165a. The first/second data line 171a/171b includes a first/second source electrode 173c/173d and an end portion 179a/179b. The first drain electrode 175c includes an expansion 177c, and the second drain electrode 175d includes an expansion 177d1 and an end portion 177d2.

A passivation layer 180 is formed on the data conductors 171a, 171b, 175c and 175d, the gate insulating layer 140, and exposed portions of the semiconductor stripes 151. A plurality of contact holes 181, 182a, 182b, 185c, 185d1 and 185d2 are provided at the passivation layer 180 and the gate insulating layer 140. A pixel electrode 191 including first and second subpixel electrodes 191c and 191d and a plurality of contact assistants 81, 82a and 82b are formed on the passivation layer 180. The second subpixel electrode 191d includes lower and upper electrode parts 191d1 and 191d2. The first subpixel electrode 191c has a cutout 91c, and the second subpixel electrode 191d has cutouts 92d and 93d. An alignment layer 11 is formed on the pixel electrodes 191 and the passivation layer 180.

Regarding the upper panel 200, a light blocking member 220, a color filter 230, an overcoat 250, a common electrode 270 having a plurality of cutouts 71c, 72d and 73d, and an alignment layer 21 are formed on an insulating substrate 210.

However, the number of the gate lines 121 in the LC panel assembly shown in FIGS. 12 and 13 is half that in the LC panel assembly shown in FIGS. 9 and 10, and the number of the data lines 171a and 171b in the LC panel assembly shown in FIGS. 12 and 13 is twice that in the LC panel assembly shown in FIGS. 9 and 10. Furthermore, first and second TFTs Qc and Qd coupled to the first and second subpixel electrodes 191c and 191d are connected to the same gate line 121 and different data lines 171a and 171b.

The first TFT Qc is disposed right to the first data line 171a and the second TFT Qd is disposed left of the second data line 171b.

The semiconductors 154c and 154d extend along the data lines 171a and 171b and the drain electrodes 175c and 175d to form the semiconductor stripes 151. The semiconductor stripes 151 have almost the same planar shapes as the data conductors 171a, 171b, 175c and 175d as well as the underlying ohmic contacts 161 and 165c.

A method of manufacturing the lower panel, according to an exemplary embodiment of the present invention, simultaneously forms the data conductors 171a, 171b, 175c and 175d, the semiconductors 151, and the ohmic contacts 161 and 165c using a photolithography process.

A photoresist pattern for the photolithography process has position-dependent thickness, and in particular, it has first and second portions with decreased thickness. The first portions are located on wire areas that will be occupied by the data conductors 171a, 171b, 175c and 175d and the second portions are located on channel areas of TFTs Qc and Qd.

The position-dependent thickness of the photoresist is obtained by several techniques, for example, by providing translucent areas on the exposure mask as well as light transmitting transparent areas and light blocking opaque areas. The translucent areas may have a slit pattern, a lattice pattern, a thin film(s) with intermediate transmittance or intermediate thickness. When using a slit pattern, the width of the slits or the distance between the slits may be smaller than the resolution of a light exposer used for the photolithography. Another example is to use a reflowable photoresist. Once a photoresist pattern made of a reflowable material is formed by using a normal exposure mask only with transparent areas and opaque areas, it is subject to a reflow process and flows onto areas without the photoresist, thereby forming thin portions.

As a result, the manufacturing process is simplified by omitting a photolithography step.

It is to be understood that various features of the LC panel assembly shown in FIGS. 9 and 10 may be applicable to the LC panel assembly shown in FIGS. 12 and 13.

Structures of LC panel assemblies according to other exemplary embodiments of the present invention will be described in detail with reference to FIGS. 1, 2, 3, 14, 15, 16, 17 and 18.

Figure 14:
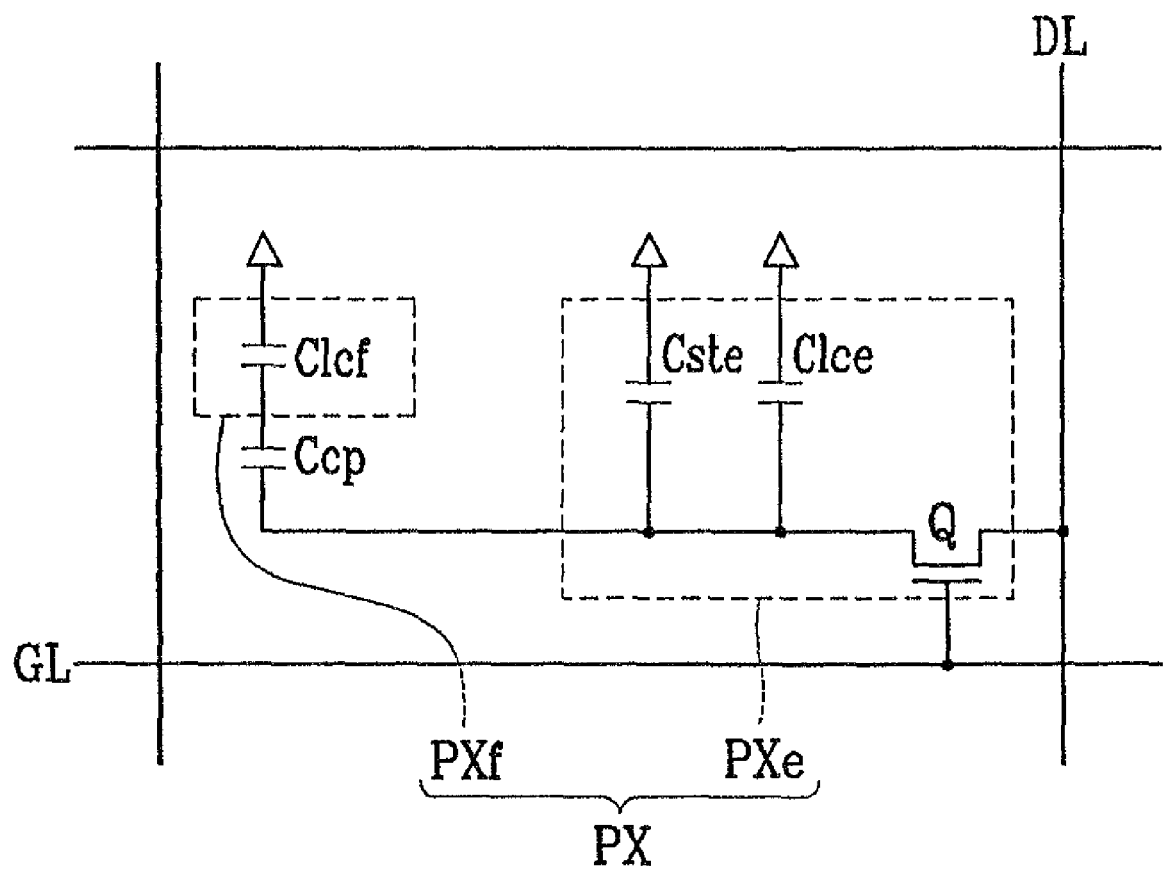
FIG. 14 is an equivalent circuit diagram of signal lines and a pixel of an LCD according to an exemplary embodiment of the present invention.

FIG. 14 is an equivalent circuit diagram of signal lines and a pixel according to an exemplary embodiment of the present invention. The LC panel assembly shown in FIG. 14 includes a plurality of signal lines and a plurality of pixels PX connected thereto. The signal lines include a plurality of gate lines GL and a plurality of data lines DL.

Each pixel PX includes a pair of first and second subpixels PXe and PXf and a coupling capacitor Ccp connected between the first subpixel PXe and the second subpixel PXf.

The first subpixel PXe includes a switching element Q connected to one of the gate lines GL and one of the data lines DL, a first LC capacitor Clce coupled to the switching element Q, and a storage capacitor Cste connected to the switching element Q. The second subpixel PXf includes a second LC capacitor Clcf coupled to the coupling capacitor Ccp.

The switching element Q such as a thin film transistor (TFT) is provided on the lower panel 100 and has three terminals: a control terminal connected to a gate line GL; an input terminal connected to a data line DL; and an output terminal connected to the LC capacitor Clce, the storage capacitor Cste, and the coupling capacitor Ccp.

The switching element Q transmits data voltages from the data line DL in response to gate signals from the gate line GL to the first LC capacitor Clce and the coupling capacitor Ccp, and the coupling capacitor Ccp coverts the magnitude of the data voltage and supplied to the second LC capacitor Clcf.

In an exemplary embodiment of the present invention, the common voltage Vcom is applied to the storage capacitor Cste and the capacitor Clce, Cste, Clcf or Ccp and a voltage Ve stored in the first LC capacitor Clce and a voltage Vf stored in the second LC capacitor Clcf satisfies:

$$Vf = Ve \times [Ccp/(Ccp+Clcf)].$$

Since Ccp/(Ccp+Clcf) is smaller than one, the voltage Vf stored in the second LC capacitor Clcf is smaller than the voltage Ve stored in the first LC capacitor Clce. The relation is also satisfied even though the voltage applied to the storage capacitor Cste is not the common voltage Vcom.

For example, the desired ratio of the voltages Ve and Vf can be obtained by adjusting the capacitance of the coupling capacitor Ccp.

Examples of an LC panel assembly shown in FIG. 14 according to exemplary embodiments of the present invention will be described in detail with reference to FIGS. 15-19.

Figure 15:
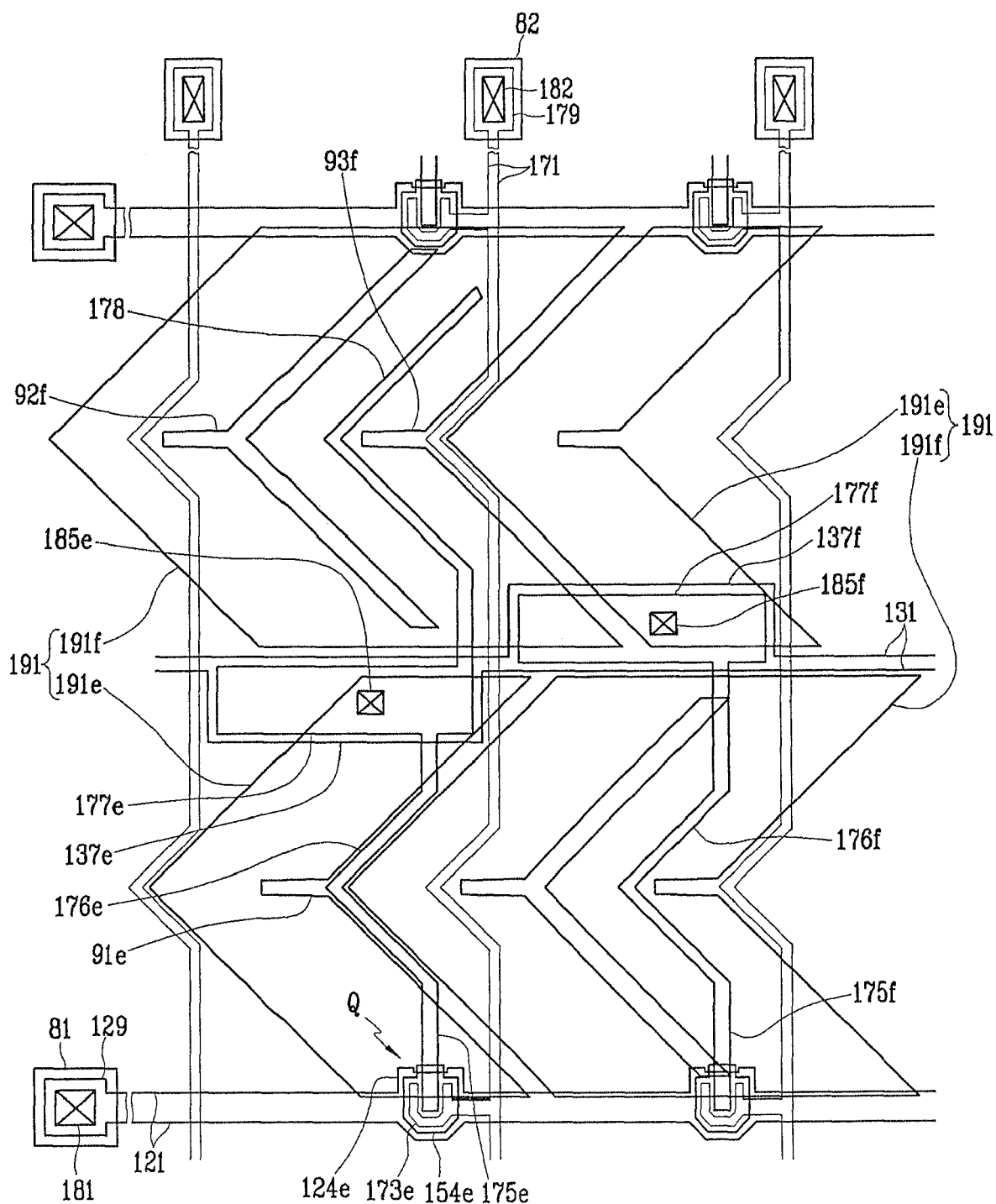
FIG. 15 is a layout view of a lower panel for a LC panel assembly according to an exemplary embodiment of the present invention.
Figure 16:
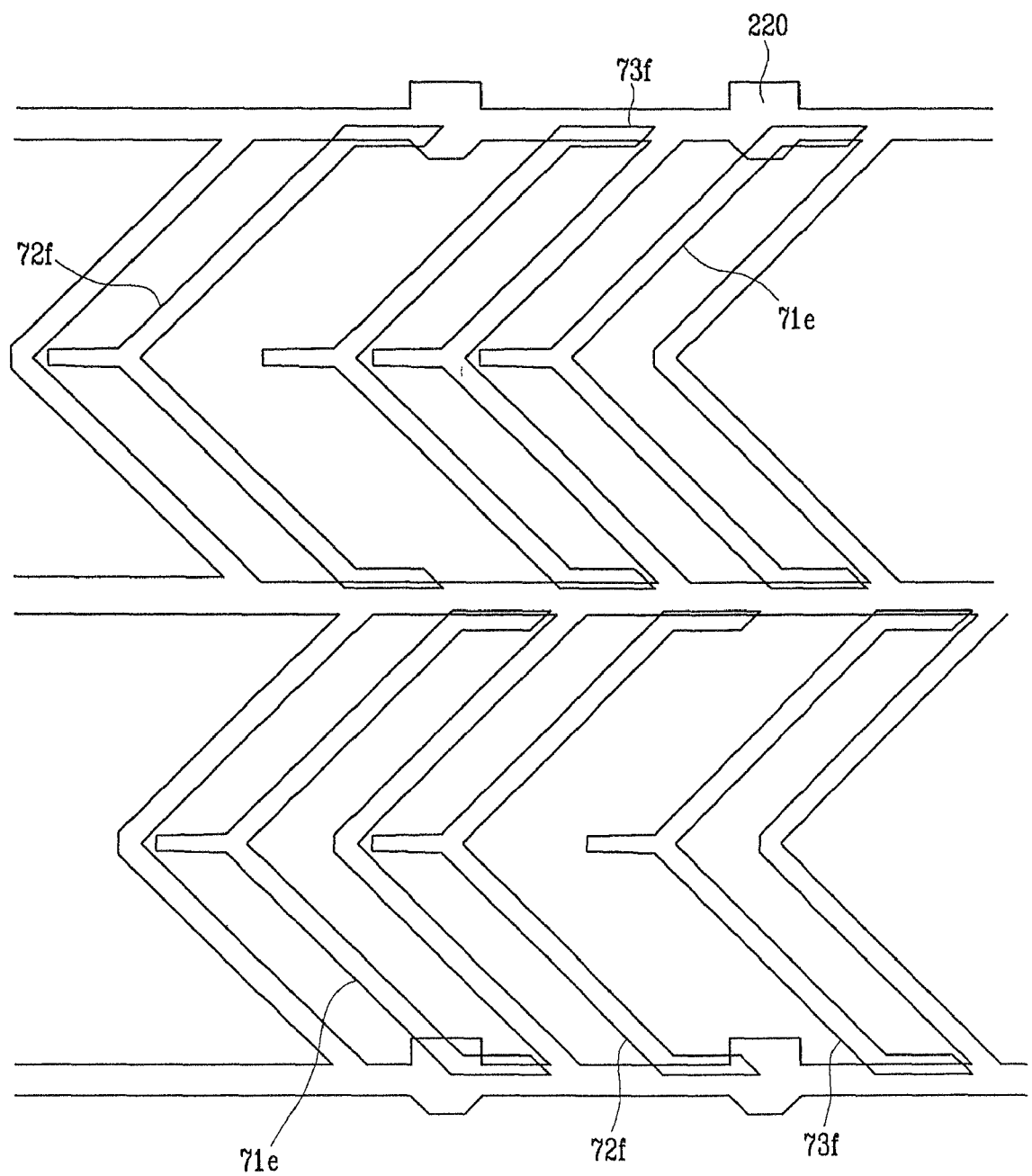
FIG. 16 is a layout view of an upper panel for a LC panel assembly according to an exemplary embodiment of the present invention.
Figure 17:
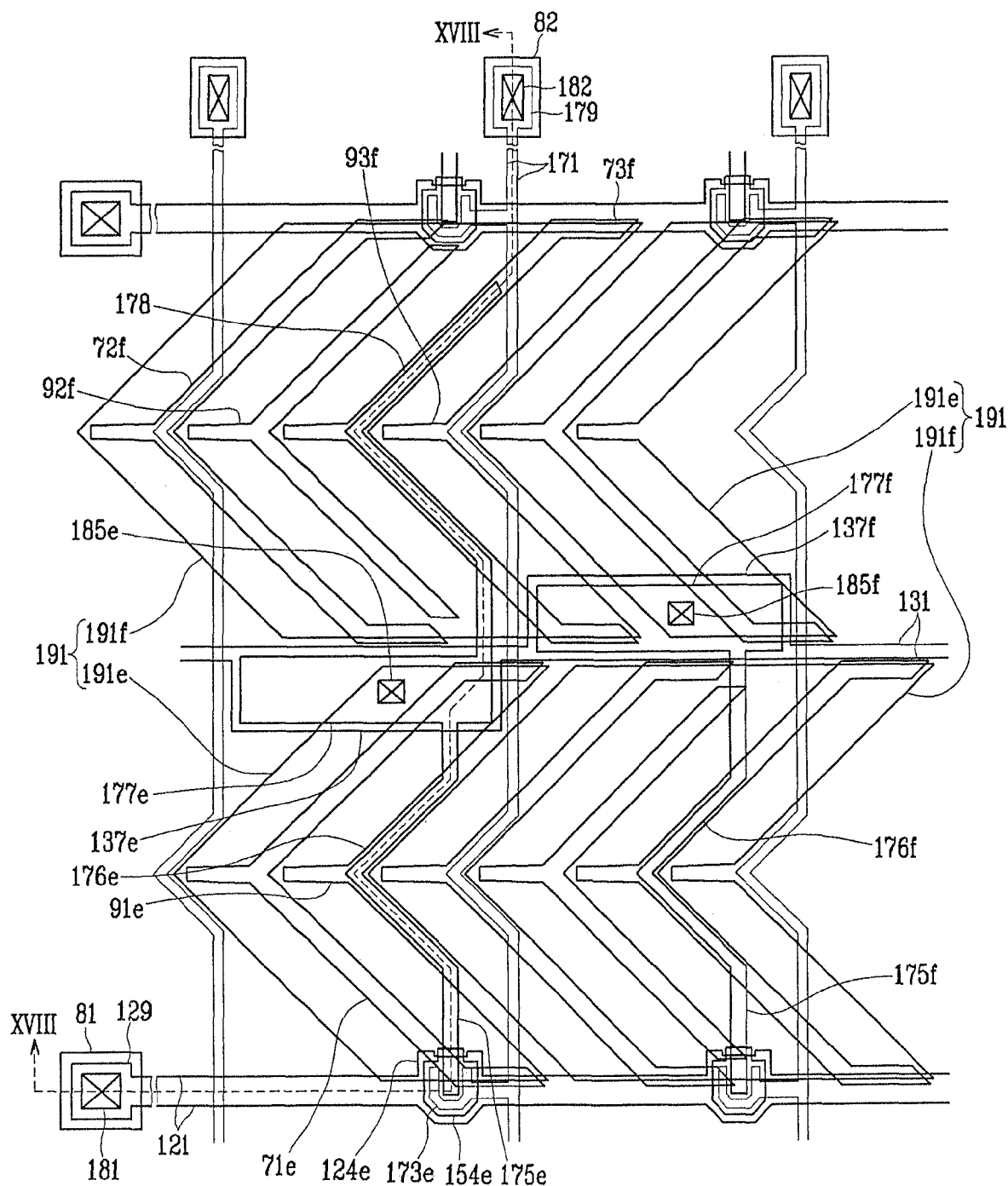
FIG. 17 is a layout view of a LC panel assembly including the lower panel shown in FIG. 15 and the upper panel shown in FIG. 16.
Figure 18:
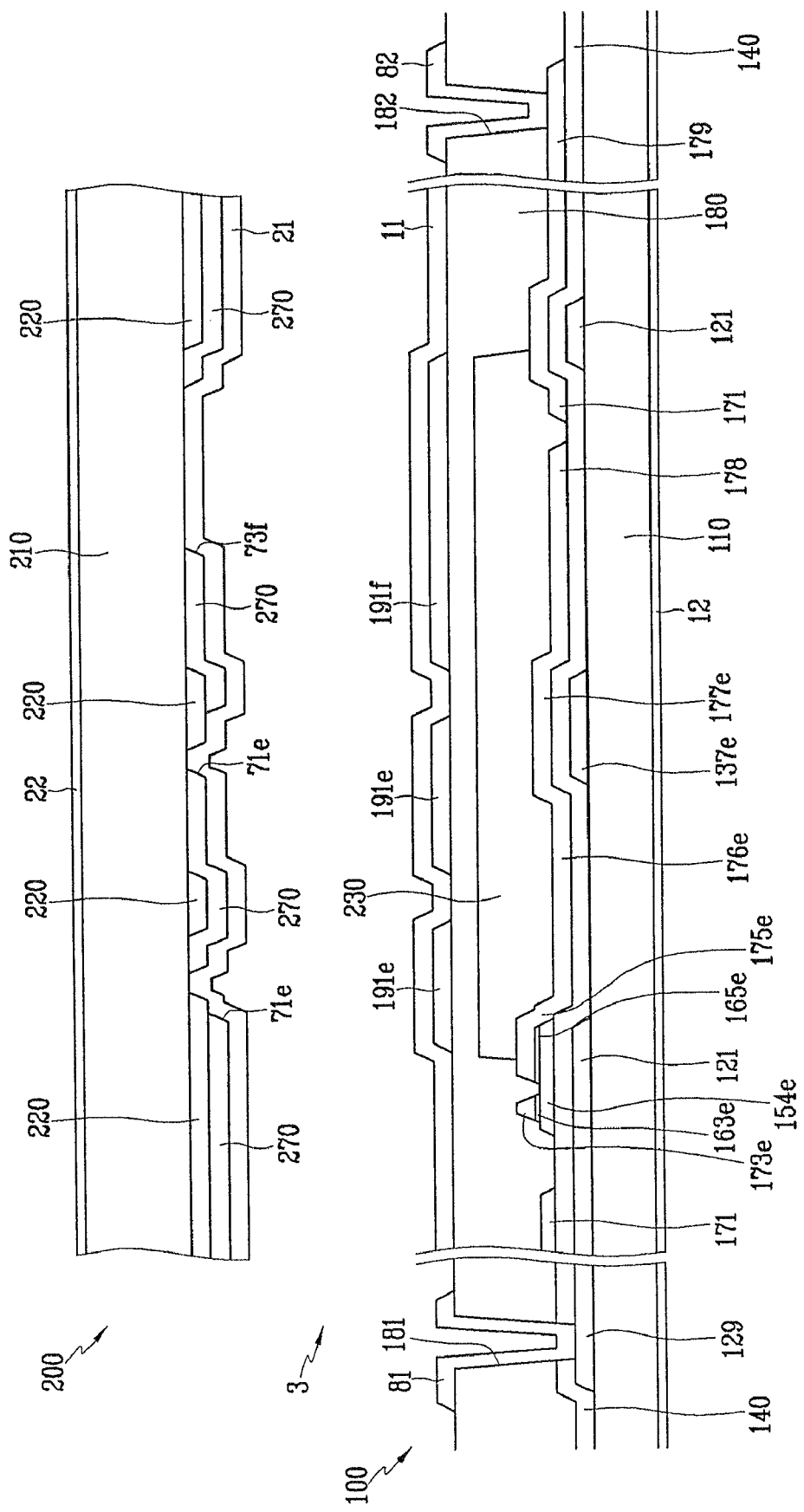
FIG. 18 is a sectional view of the LC panel assembly shown in FIG. 17 taken along line XVIII-XVIII.
Figure 19:
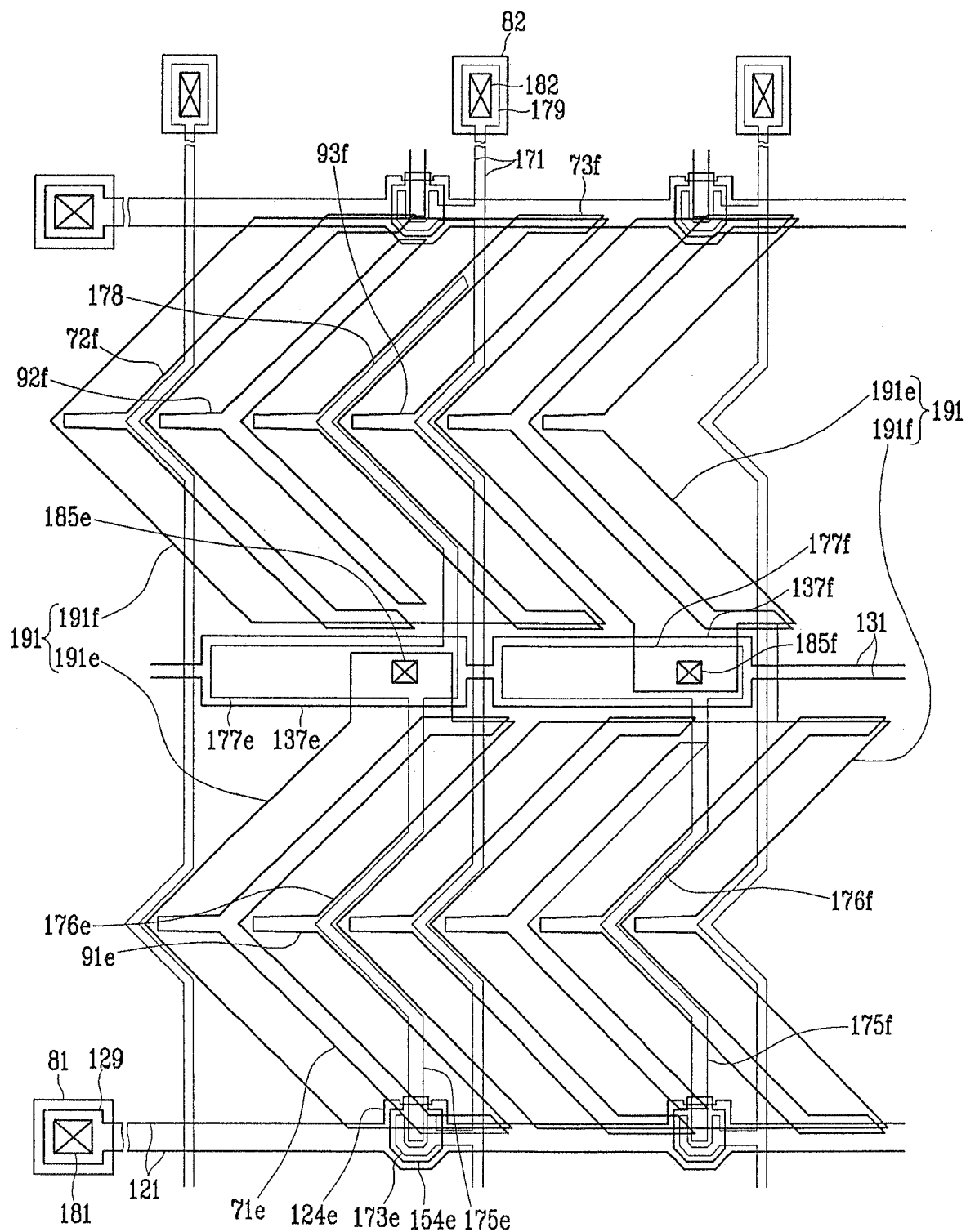
FIG. 19 is a layout view of a LC panel assembly according to an exemplary embodiment of the present invention.

FIG. 15 is a layout view of a lower panel for a LC panel assembly according to an exemplary embodiment of the present invention. FIG. 16 is a layout view of an upper panel for a LC panel assembly according to an exemplary embodiment of the present invention. FIG. 17 is a layout view of a LC panel assembly including the lower panel shown in FIG. 15 and the upper panel shown in FIG. 16. FIG. 18 is a sectional view of the LC panel assembly shown in FIG. 17 taken along line XVIII-XVIII. FIG. 19 is a layout view of a LC panel assembly according to an exemplary embodiment of the present invention.

Referring to FIGS. 15-19, a LC panel assembly includes a lower panel 100, an upper panel 200 facing the lower panel 100, and a LC layer 3.

First, the lower panel 100 will be described.

A plurality of gate conductors including a plurality of gate lines 121 and a plurality of storage electrode lines 131 are formed on an insulating substrate 110.

The gate lines 121 extend substantially in a transverse direction, and include a plurality of gate electrodes 124 extending upward and downward and an end portion 129 having a large area for contact with another layer or an external driving circuit.

Each of the storage electrode lines 131 extends substantially parallel to the gate lines 121 and is substantially equidistant from two adjacent gate lines 121. Each of the storage electrodes 131 shown in FIG. 17 includes first type storage electrodes 137e expanding downward and second type storage electrodes 137f expanding upward. The first type storage electrodes 137e and the second type storage electrodes 137f are alternately arranged. The storage electrodes 131 shown in FIG. 19 include storage electrodes 137e and 137f expanding upward and downward.

A gate insulating layer 140 is formed on the gate conductors 121 and 131, and a plurality of semiconductor islands 154e are formed on the gate insulating layer 140. The semiconductor islands 154 are disposed on the gate electrodes 124.

A plurality of pairs of ohmic contact islands 163e and 165e are formed on the semiconductor island 154.

A plurality of data conductors including a data line 171 and a plurality of drain electrodes 175e and 175f are formed on the ohmic contacts 163e and 165e and the gate insulating layer 140.

The data lines 171 extend substantially in the longitudinal direction to intersect the gate lines 121 and the storage electrode lines 131. Each of the data lines 171 includes a plurality of curved portions projecting left, and each of the curved portions includes a pair of oblique portions that are connected to each other to form a chevron and make an angle of about 45 degrees with the gate lines 121.

Each of the data lines 171 includes a plurality of source electrodes 173e extending toward the gate electrodes 124e, and a wide end portion 179.

The drain electrodes 175e and 175f are separated from the data line 171 and are disposed opposite the source electrodes 173e with respect to the gate electrodes 124. The drain electrodes 175e and 175f include two types of drain electrodes.

The first type drain electrode 175e includes first and second curved portions 176e and 178 and an expansion 177e. The first curved portion 176e includes a first end partly enclosed by a source electrode 173e and a second end connected to the expansion 177e. The expansion 177e is connected to the first and the second curved portions 176e and 178 and overlaps a first type storage electrode 137e. Each of the first and the second curved portions 176e and 178 includes a pair of oblique portions that are connected to each other to form a chevron or an inequality and make an angle of about 45 degrees with the gate lines 121.

The second type drain electrode 175f includes only one curved portion 176f and an expansion 177f connected thereto. The curved portion 176f includes an end partly enclosed by a source electrode 173e and curved like an inequality. The expansion 177f overlaps a second type storage electrode 137f.

A gate electrode 124e, a source electrode 173e, and a drain electrode 175e or 175f along with a semiconductor island 154e form a first/second TFT Q having a channel formed in the semiconductor island 154e disposed between the source electrodes 173e and the drain electrodes 175e or 175f.

A passivation layer 180 is formed on the data conductors 171, 175e and 175f and the exposed portions of the semiconductor islands 154e.

The passivation layer 180 has a plurality of contact holes 182 exposing the end portions 179 of the data lines 171, a plurality of contact holes 185e exposing the expansions 177e of the drain electrodes 175e, and a plurality of contact holes 185f exposing the expansions 177f of the drain electrodes 175f. The passivation layer 180 and the gate insulating layer 140 have contact holes 181 exposing the end portions 129 of the gate lines 121.

A plurality of pixel electrodes 191 and a plurality of contact assistants 81 and 82 are formed on the passivation layer 180.

Each of the pixel electrodes 191 includes a pair of first and second subpixel electrodes 191e and 191f, and each of the subpixel electrodes 191e and 191f has cutout(s) 91e, 92f and 93f.

The data lines 171, in particular, the curved portions of the data lines 171 extend along some of the curved edges of the pixel electrodes 191 to be curved. Therefore, the electric field generated between the data lines 171 and the subpixel electrodes 191a and 191b has a horizontal component substantially parallel to the horizontal component of the primary electric field such that the determination of the tilt direction of the LC molecules is enhanced. In addition, the aperture ratio is increased.

In addition, the storage electrode lines 131 are disposed near the boundaries of the first and the second subpixel electrodes 191a and 191b to cover texture and to increase the aperture ratio.

The first subpixel electrodes 191e shown in FIG. 19 include portions extending upward or downward onto the storage electrodes 137e and 137f.

Since other structural features of the pixel 191 are described above with reference to FIG. 3, further description thereof will be omitted.

The first subpixel electrodes 191e are connected to the drain electrodes 175e and 175f through the contact holes 185e and 185f. The projections of the first subpixel electrodes 191e shown in FIG. 19 is connected to the drain electrodes 175e and 175f through the contact holes 185e and 185f. The curved portions 176f and 178 of the drain electrodes 175e and 175f overlap the second subpixel electrodes 191f to form a coupling capacitor Ccp.

A first/second subpixel electrode 191e/191f and the common electrode 270 along with a portion of the LC layer 3 disposed therebetween form a first/second LC capacitor Clca/Clcb, which stores applied voltages after the TFT Q turns off.

The first subpixel electrodes 191e and the drain electrodes 175e connected thereto overlap the storage electrodes 137e and 137f with the gate insulating layer 140 interposed therebetween to form storage capacitors Cste. The storage capacitors Cste enhance the charge storing capacity of the LC capacitors Clce.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

Hereinafter, the upper panel 200 will be described with reference to FIGS. 16-19.

A light blocking member 220 is formed on an insulating substrate 210 such as transparent glass or plastic. The light blocking member 220 includes transverse portions facing the gate lines 121 on the lower panel 100 and widened portions facing the TFTs Q on the lower panel 100.

A plurality of color filters 230 are also formed on the substrate 210 and the light blocking member 220 and an overcoat 250 is formed on the color filters 230 and the light blocking member 220. A common electrode 270 having a plurality of cutouts 71e, 72f and 73f is formed on the overcoat 250.

Since the configurations of the cutouts 71e, 72f and 73f are described above with reference to FIG. 3, further description thereof will be omitted.

Alignment layers 11 and 21 are formed on inner surfaces of the panels 100 and 200, and polarizers 12 and 22 are provided on outer surfaces of the panels 100 and 200.

It is to be understood that various features of the LC panel assembly shown in FIGS. 9 and 10 may be applicable to the LC panel assembly shown in FIGS. 15-19.

Hereinafter, a structure of an LC panel assembly according to an exemplary embodiment of the present invention will be described in detail with reference to FIGS. 1, 2, 3, 20, 21 and 22.

Figure 20:
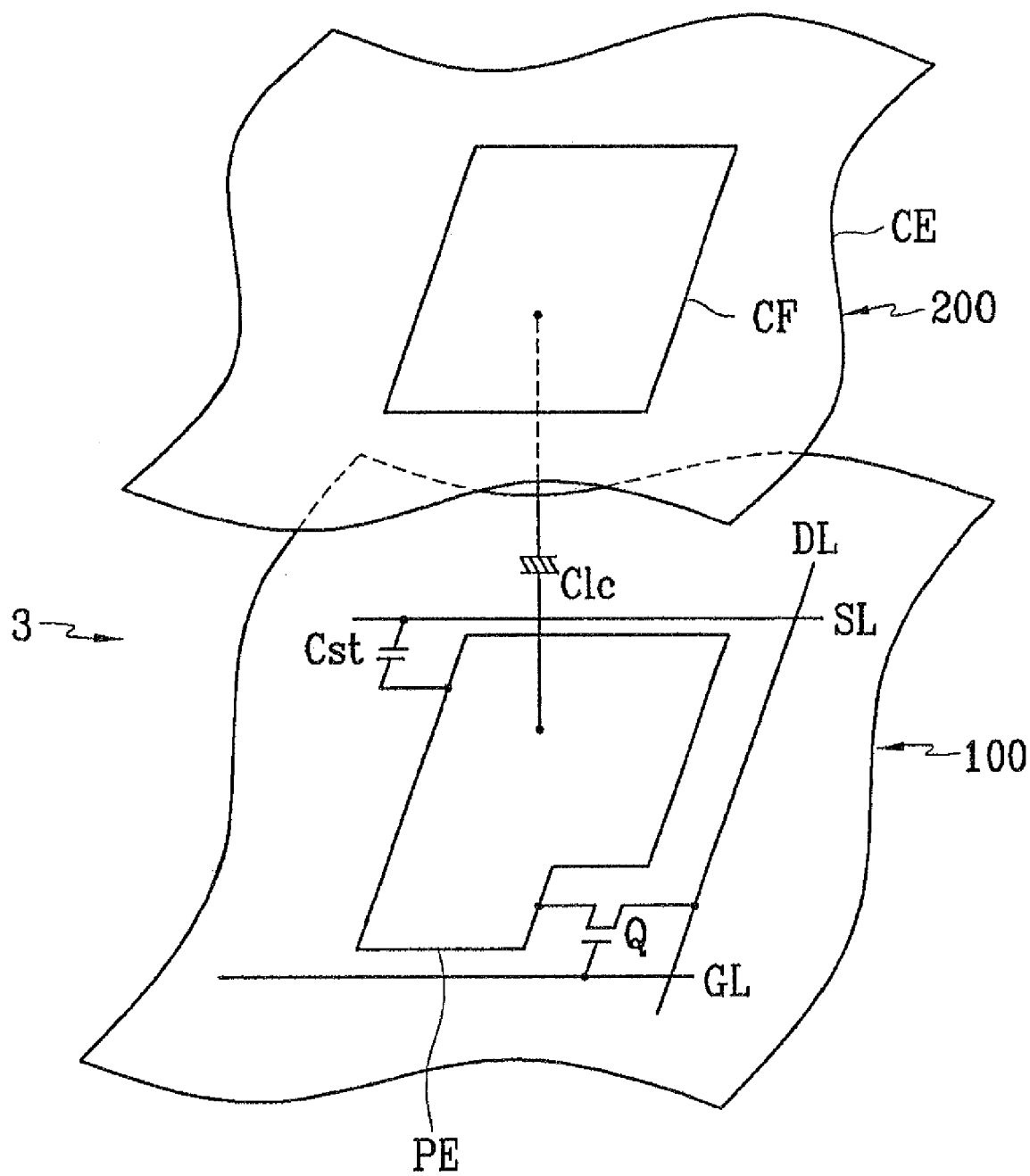
FIG. 20 is an equivalent circuit diagram of signal lines and a pixel of an LCD according to an exemplary embodiment of the present invention.

FIG. 20 is an equivalent circuit diagram of signal lines and a pixel according to an exemplary embodiment of the present invention.

The LC panel assembly shown in FIG. 20 includes a lower panel 100, an upper panel 200 facing the lower panel 200, and a LC layer 3 disposed between the panels 100 and 200.

A plurality of signal lines including gate lines GL, data lines DL, and storage electrode lines SL are formed on the lower panel 100. Each pixel includes a switching element Q connected to one of the gate lines GL and one of the data lines DL, a LC capacitor Clc coupled to the switching element Q, and a storage capacitor Cst connected between the switching element Q and the storage electrode line SL.

The switching element Qc/Qd such as a thin film transistor (TFT) is provided on the lower panel 100 and has three terminals: a control terminal connected to a gate line GL; an input terminal connected to a data line DL; and an output terminal connected to the LC capacitor Clc and the storage capacitor Cst.

The LC capacitor Clc includes a pixel electrode PE and a common electrode CE provided on an upper panel 200 as two terminals. The LC layer 3 disposed between the electrodes PE and CE functions as dielectric of the LC capacitor Clc. The common electrode CE is supplied with a common voltage Vcom and covers an entire surface of the upper panel 200. The LC layer 3 may have a negative dielectric anisotropy, and LC molecules in the LC layer 3 may be oriented so that longitudinal axes of the LC molecules are perpendicular to the surfaces of the panels 100 and 200 in absence of electric field.

Since the storage capacitor Cst and the operations of the LCD including the panel assembly shown in FIG. 20 are substantially the same as those described above, further description thereof will be omitted. However, it is noted that a pixel PX is not divided into two subpixels.

Figure 21:
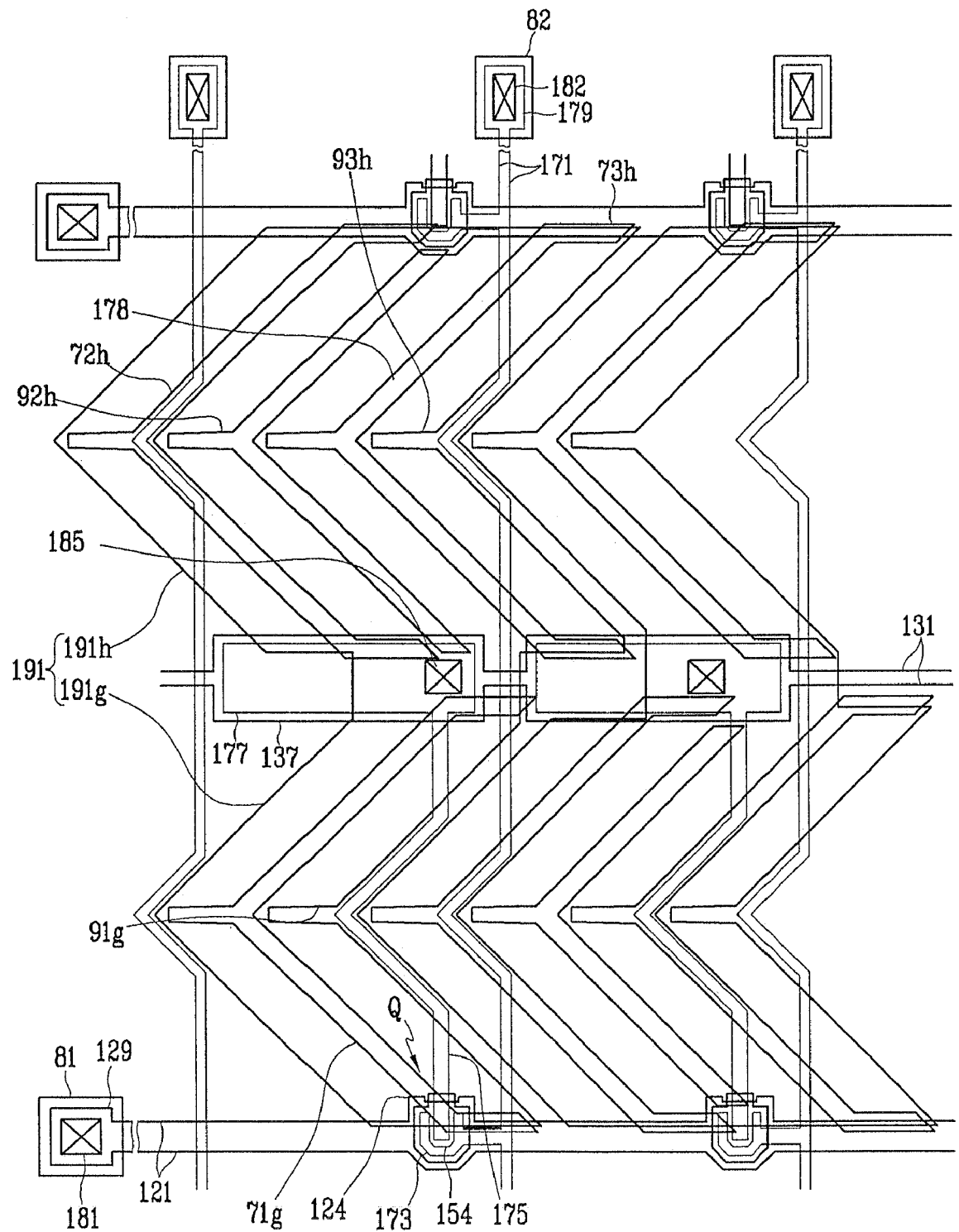
FIGS. 21 and 22 are layout views of an LC panel assembly according to exemplary embodiments of the present invention.
Figure 22:
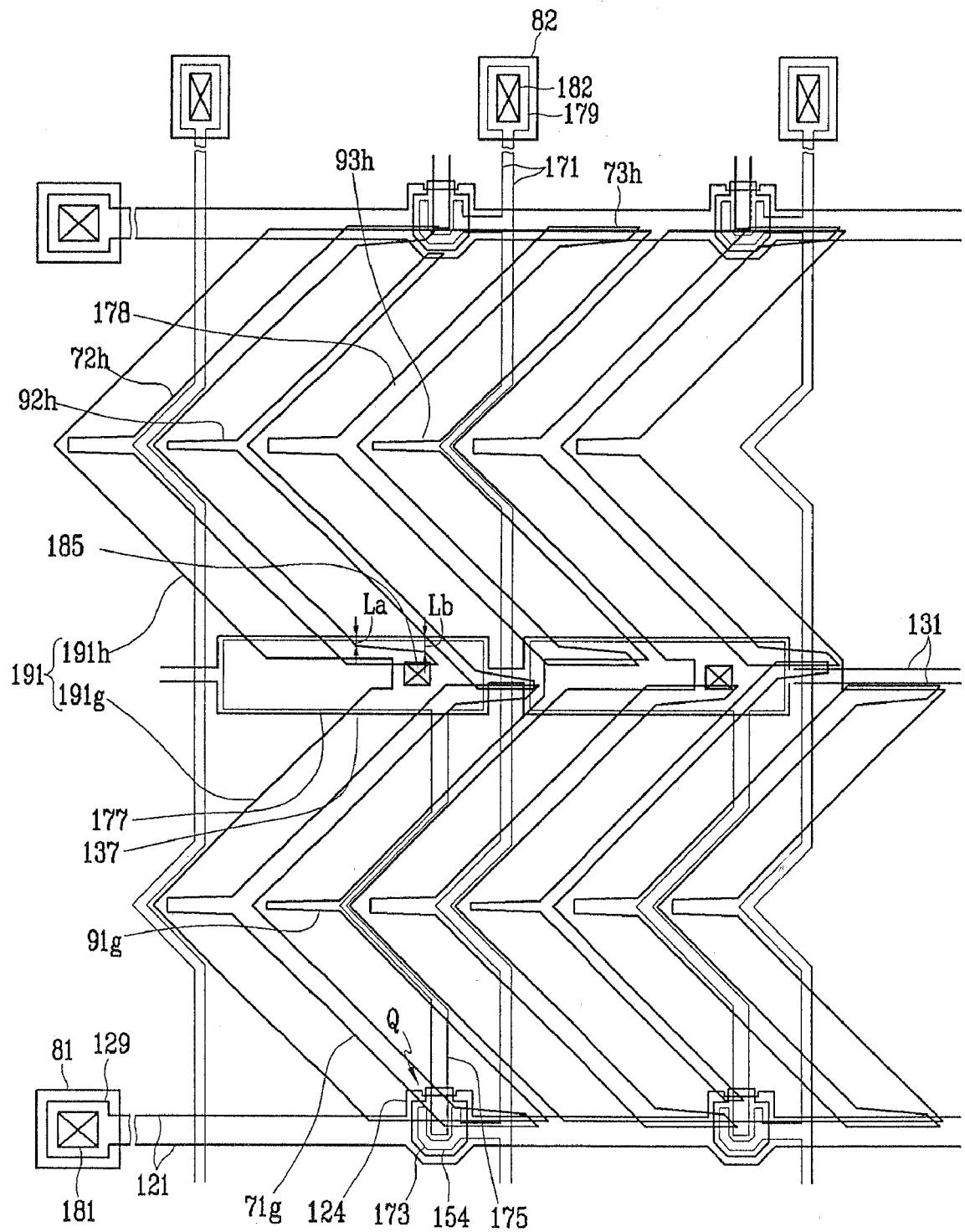

Examples of a LC panel assembly shown in FIG. 20 according to exemplary embodiments of the present invention will be described in detail with reference to FIGS. 21 and 22. FIGS. 21 and 22 are layout views of an LC panel assembly according to exemplary embodiments of the present invention.

Referring to FIGS. 21 and 22, an LC panel assembly includes a lower panel (not shown), an upper panel (not shown) facing the lower panel, and a LC layer (not shown) disposed between the panels. Layered structures of the LC panel assembly shown in FIGS. 21 and 22 are substantially the same as those shown in FIGS. 15-19.

Regarding the lower panel, a plurality of gate conductors including gate lines 121 and storage electrode lines 131 are formed on a substrate (not shown). Each of the gate lines 121 includes gate electrodes 124 and an end portion 129, and the storage electrode line 131 includes storage electrodes 137. A gate insulating layer (not shown) is formed on the gate conductors 121 and 131. A plurality of semiconductor islands 154 are formed on the gate insulating layer, and a plurality of ohmic contacts (not shown) are formed on the semiconductor islands 154.

A plurality of data conductors including a plurality of data lines 171 and a plurality of drain electrodes 175 are formed on the ohmic contacts and the gate insulating layer. The data lines 171 include a plurality of source electrodes 173 and an end portion 179, and the drain electrodes 175 includes wide end portions 177.

A passivation layer 180 is formed on the data conductors 171 and 175, the gate insulating layer, and exposed portions of the semiconductor islands 154. A plurality of contact holes 181, 182 and 185 are provided at the passivation layer 180 and the gate insulating layer. A plurality of pixel electrodes 191 including first and second subpixel electrodes 191g and 191h connected to each other and a plurality of contact assistants 81 and 82 are formed on the passivation layer 180. The first subpixel electrode 191g has a cutout 91g, and the second subpixel electrode 191h has cutouts 92h and 93h. An alignment layer (not shown) is formed on the pixel electrodes 191 and the passivation layer 180.

Regarding the upper panel, a light blocking member (not shown), a plurality of color filters (not shown), an overcoat (not shown), a common electrode having a plurality of cutouts 71g, 72h and 73h, and an alignment layer (not shown) are formed on an insulating substrate (not shown).

However, in an LC panel assembly shown in FIGS. 21 and 22, a first subpixel electrode 191g and a second subpixel electrode 191h of a pixel electrode 191 are connected to each other, unlike those shown in FIGS. 15-19, and there is no curved portion 178 as shown in FIGS. 15-19. The first subpixel electrode 191g and the second subpixel electrode 191h have substantially equal voltage.

In comparing the LC panel assembly shown in FIG. 22 with that shown in FIG. 21, the cutouts 91g, 92h and 93h of the pixel electrodes 191 are narrower than the cutouts 71g, 72h and 73h of the common electrode 270, and the distance between a first subpixel electrode 191g and a second subpixel electrode 191h adjacent to each other is smaller than the width of the cutouts 71g, 72h and 73h. The distance or the gap between a first subpixel electrode 191g and a second subpixel electrode 191h may be equal to about 5.5 microns to about 7.5 microns.

The small width of the cutouts 91g, 92h and 93h and the small distance between the subpixel electrodes 191g and 191h increase the transmitting area of the light to increase the light transmittance.

Referring to FIG. 22, each of terminal transverse portions of the cutouts 71g, 72h and 73h of the common electrode 270 has a transverse edge overlapping a pixel electrode 191 and making an angle larger than about 135 degrees with a curved portion of the cutouts 71g, 72h and 73h. Then, the horizontal component of the primary electric field near a transverse edge of the pixel electrode 191 approaches a tilt direction of the LC molecules on a sub-area defined by the terminal transverse portion of the cutouts 71g, 72h and 73h, reducing texture caused by the disorder of the LC molecules there. The width of the cutouts 71g, 72h and 73h may be equal to about 9.5 microns to about 10.5 microns.

The width of the cutouts 91g, 92h and 93h may be equal to about 8-10 microns. The width of the cutouts 91g, 92h and 93h may be equal to 8 microns to about 9 microns for increasing the light transmitting area to increase the light transmittance.

The width of a storage electrode 137 shown in FIG. 22 is smaller than the width of the storage electrode 137 shown in FIG. 21. In addition, the distance between a transverse edge of a storage electrode 137 and an adjacent transverse edge of a terminal transverse portion of the cutouts 71g, 72h, 73h and 92h disposed on the storage electrode 137 may be equal to or larger than about one micron. In an exemplary embodiment of the present invention, the closest distance La from the transverse edge of the storage electrode 137 to the adjacent transverse edge of the terminal transverse portion of the cutouts 71g, 72h, 73h and 92h is smaller than the farthest distance Lb and equal to or larger than about one micron. This configuration reduces the degradation of the image quality caused by the texture near the cutouts 71g, 72h, 73h and 92h.

It is to be understood that various features of the LC panel assembly shown in FIGS. 15-19 may be applicable to the LC panel assembly shown in FIGS. 21 and 22 and vice versa.

An LCD according to exemplary embodiments of the present invention improves both the visibility and the aperture ratio. In an LCD according to exemplary embodiments of the present invention, the control of the LC molecules is enhanced and the response time and the light transmittance are improved. In addition, the degradation of the image quality caused by the texture is reduced and the balance of colors is easily obtained.

Although the exemplary embodiments of the present invention have been described in detail with reference to the accompanying drawings for the purpose of illustration, it is to be understood that the inventive processes and apparatus should not be construed as limited thereby. It will be readily apparent to those of reasonable skill in the art that various modifications can be made without departing from the scope of the present invention as defined by the appended claims, with equivalents of the claims to be included therein.

What is claimed is:

1. A liquid crystal display comprising:
 a pixel electrode comprising a first subpixel electrode and a second subpixel electrode, each of the first and the second subpixel electrodes including two oblique edges disposed opposite each other and substantially parallel to each other, wherein the first and the second subpixel electrodes are arranged in a direction oblique to the oblique edges;
 a common electrode disposed opposite the pixel electrode;
 a liquid crystal layer disposed between the pixel electrode and the common electrode;
 a first tilt direction determining member provided at the second subpixel electrode, extending substantially parallel to the oblique edges, and determining a tilt direction of liquid crystal molecules in the liquid crystal layer; and
 a plurality of second tilt direction determining members provided at the common electrode and determining tilt directions of the liquid crystal molecules, each second tilt direction determining member comprising a first portion substantially parallel to the oblique edges and either disposed between the oblique edges or between one of the oblique edge and the first tilt direction determining member,
 wherein each of the first and the second subpixel electrodes is divided into a plurality of sub-areas by the first or the second tilt direction determining members and the oblique edges,
 the number of the sub-areas in the first subpixel electrode is different from the number of the sub-areas in the second subpixel electrode, and
 the oblique edges of the first subpixel electrode are offset from the oblique edges of the second subpixel electrode.

2. The liquid crystal display of claim 1, further comprising a polarizer having a polarization axis making an angle of about 45 degrees with the oblique edges of the first subpixel electrode and the oblique edges of the second subpixel electrode.

3. The liquid crystal display of claim 1, wherein the sub-areas have substantially equal area.

4. The liquid crystal display of claim 1, wherein an area of each of the sub-areas is relatively smaller in relation to a distance of the sub-area from the oblique edges.

* * * * *